(12) United States Patent
Amini et al.

(10) Patent No.: US 12,289,202 B2
(45) Date of Patent: Apr. 29, 2025

(54) ADJUSTING PARAMETERS IN A NETWORK-CONNECTED SECURITY SYSTEM BASED ON CONTENT ANALYSIS

(71) Applicant: Arlo Technologies, Inc., Carlsbad, CA (US)

(72) Inventors: Peiman Amini, Cupertino, CA (US); Joseph Amalan Arul Emmanuel, Mountain View, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 196 days.

(21) Appl. No.: 18/303,977

(22) Filed: Apr. 20, 2023

(65) Prior Publication Data

US 2023/0344705 A1    Oct. 26, 2023

Related U.S. Application Data

(63) Continuation-in-part of application No. 17/188,841, filed on Mar. 1, 2021, now Pat. No. 11,665,056.
(Continued)

(51) Int. Cl.
| | |
|---|---|
| *H04L 41/0813* | (2022.01) |
| *G06V 20/40* | (2022.01) |
| *G06V 20/52* | (2022.01) |
| *G08B 13/196* | (2006.01) |
| *H04L 43/08* | (2022.01) |
| *H04N 7/18* | (2006.01) |

(52) U.S. Cl.
CPC ......... *H04L 41/0813* (2013.01); *G06V 20/41* (2022.01); *G06V 20/52* (2022.01); *G08B 13/19656* (2013.01); *H04L 43/08* (2013.01); *H04N 7/183* (2013.01); *G06V 20/44* (2022.01)

(58) Field of Classification Search
CPC . H04L 41/0813; H04L 43/08; H04L 41/0823; H04L 41/147; H04L 43/16; H04L 41/145; G06V 20/41; G06V 20/52; G06V 20/44; G06V 10/82; G08B 13/19656; G08B 13/19606; H04N 7/183
See application file for complete search history.

(56) References Cited

U.S. PATENT DOCUMENTS 9,191,431 B2    11/2015    Relyea et al.
10,798,293 B2 *  10/2020    Sudo .................. G03B 13/36
(Continued)

OTHER PUBLICATIONS

"Amazon Kinesis Video Streams Developer Guide", Amazon Web Services, Inc., 2018, 136 pp.
(Continued)

*Primary Examiner* — Shahbaz Nazrul
(74) *Attorney, Agent, or Firm* — Perkins Cole LLP

(57) ABSTRACT

Systems and methods are described for adjusting the parameters in a network-connected security system based on analysis of content generated by electronic devices in the network-connected security system. In an example embodiment, content such as video captured by a video surveillance camera is processed to analyze the performance of the network-connected security system. Based on the processing, updated parameters are selected to configure and improve the performance of the network-connected security system.

20 Claims, 22 Drawing Sheets

Related U.S. Application Data which is a continuation of application No. 16/239,307, filed on Jan. 3, 2019, now Pat. No. 10,938,649.

(60) Provisional application No. 62/644,847, filed on Mar. 19, 2018.

(56) References Cited

U.S. PATENT DOCUMENTS

| | | | |
|---|---|---|---|
| 10,902,263 B1* | 1/2021 | Angel | A61H 3/061 |
| 11,165,954 B1* | 11/2021 | Beach | H04N 23/65 |
| 11,284,012 B2* | 3/2022 | Citerin | H04N 23/90 |
| 2004/0201677 A1 | 10/2004 | Bronson | |
| 2010/0109934 A1 | 5/2010 | Drake et al. | |
| 2013/0013698 A1 | 1/2013 | Relyea et al. | |
| 2013/0053653 A1 | 2/2013 | Cuddihy et al. | |
| 2013/0128947 A1 | 5/2013 | Fryer et al. | |
| 2015/0312572 A1 | 10/2015 | Owen | |
| 2015/0379848 A1 | 12/2015 | Gallo et al. | |
| 2016/0034361 A1 | 2/2016 | Block et al. | |
| 2016/0105644 A1 | 4/2016 | Smith et al. | |
| 2016/0125714 A1 | 5/2016 | Kates et al. | |
| 2016/0284095 A1 | 9/2016 | Chalom et al. | |
| 2016/0350596 A1* | 12/2016 | Bataller | H04N 7/181 |
| 2016/0351036 A1 | 12/2016 | Saldin et al. | |
| 2016/0379055 A1 | 12/2016 | Loui et al. | |
| 2017/0063930 A1 | 3/2017 | Avi | |
| 2017/0124427 A1 | 5/2017 | Park et al. | |
| 2017/0126710 A1 | 5/2017 | De-levie et al. | |
| 2017/0242148 A1 | 8/2017 | Yu et al. | |
| 2018/0020492 A1 | 1/2018 | Dao | |
| 2018/0121610 A1 | 5/2018 | Cayle et al. | |
| 2018/0189532 A1 | 7/2018 | Bataller et al. | |
| 2018/0197397 A1 | 7/2018 | Jia et al. | |
| 2018/0213267 A1 | 7/2018 | Khoshbin | |
| 2018/0220061 A1 | 8/2018 | Wang et al. | |
| 2018/0232592 A1 | 8/2018 | Stewart et al. | |
| 2018/0232895 A1 | 8/2018 | Modestine et al. | |
| 2018/0268674 A1 | 9/2018 | Siminoff | |
| 2018/0278892 A1 | 9/2018 | Zhang et al. | |
| 2018/0286201 A1 | 10/2018 | Lemberger et al. | |
| 2018/0349709 A1* | 12/2018 | Shinohara | G06V 20/52 |
| 2018/0357871 A1 | 12/2018 | Siminoff | |
| 2019/0221090 A1 | 7/2019 | Beiser et al. | |
| 2019/0260814 A1 | 8/2019 | Amini et al. | |
| 2019/0260987 A1 | 8/2019 | Amini et al. | |
| 2019/0261243 A1 | 8/2019 | Amini et al. | |
| 2019/0327128 A1 | 10/2019 | Harpole | |
| 2019/0327453 A1 | 10/2019 | Takagi | |
| 2020/0242804 A1* | 7/2020 | Eisenmann | G06T 7/12 |
| 2021/0084382 A1 | 3/2021 | Kellicker et al. | |
| 2023/0262234 A1* | 8/2023 | Amini | H04L 43/0858 709/219 |

OTHER PUBLICATIONS

Ananthanarayanan, Ganesh, et al., "Real-time Video Analytics—the killer app for edge computing", Microsoft Research; IEEE Computer Society, 11 pages.

Girshick, Ross, "Fast R-CNN Object detection with Caffe", Microsoft Research, 30 pages.

Hosseini, Hossein, et al., "Attacking Automatic Video Analysis Algorithms: A Case Study of Google Cloud Video Intelligence API", University of Washington, Seattle, WA, Worcester Polytechnic Institute, Worcester, MA, 12 pages.

* cited by examiner

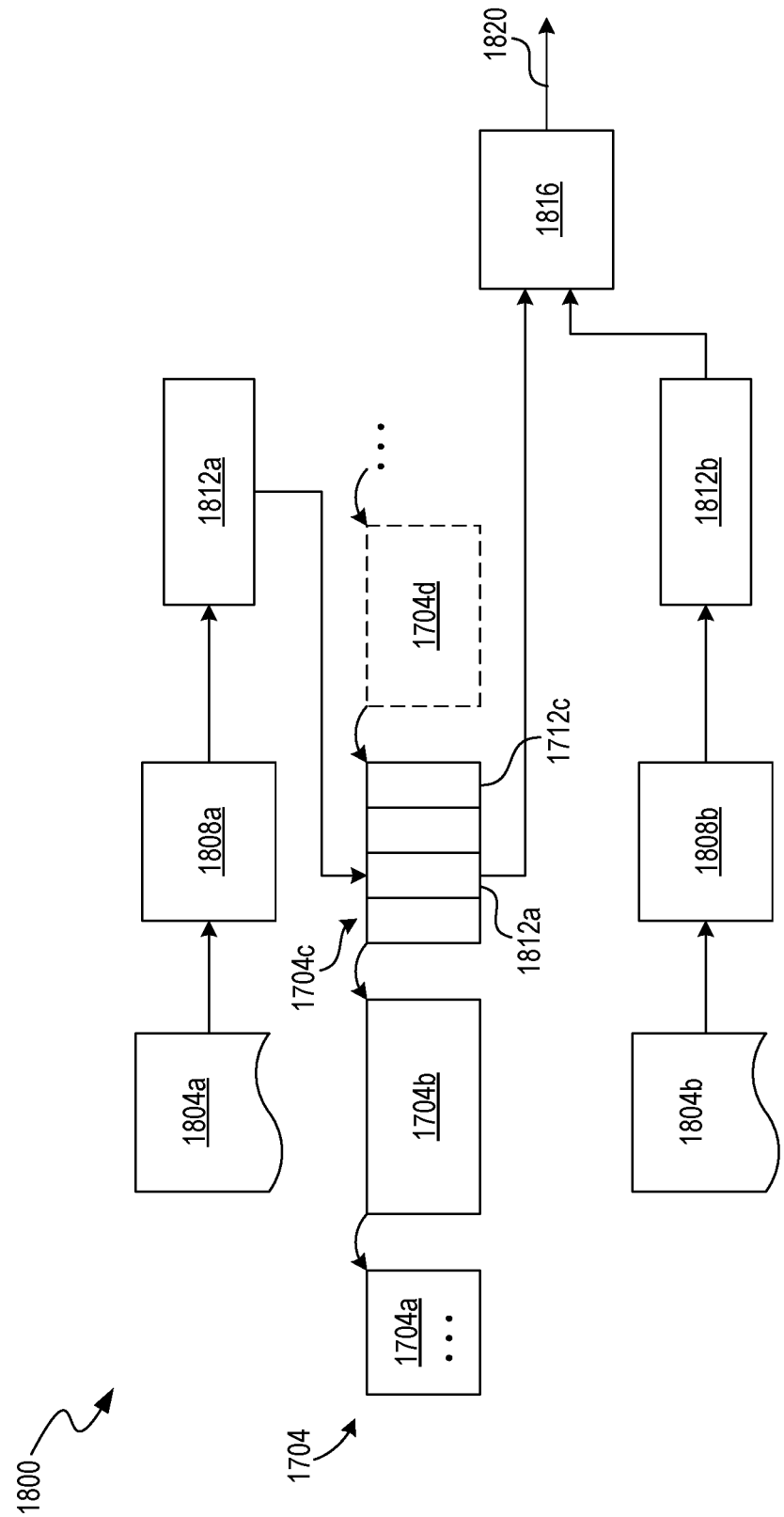

ADJUSTING PARAMETERS IN A NETWORK-CONNECTED SECURITY SYSTEM BASED ON CONTENT ANALYSIS

CROSS-REFERENCE TO RELATED APPLICATIONS

This application is a continuation in part of U.S. patent application Ser. No. 17/188,841, titled "ADJUSTING PARAMETERS IN A NETWORK-CONNECTED SECURITY SYSTEM BASED ON CONTENT ANALYSIS," filed Mar. 2, 2021, which is a continuation application of U.S. patent application Ser. No. 16/239,307, titled "ADJUSTING PARAMETERS IN A NETWORK-CONNECTED SECURITY SYSTEM BASED ON CONTENT ANALYSIS," filed Jan. 3, 2019, and issuing on Mar. 2, 2021 as U.S. Pat. No. 10,938,649, which is entitled to the benefit and/or right of priority of U.S. Provisional Application No. 62/644,847, titled, "ELASTIC PROCESSING FOR VIDEO ANALYSIS AND NOTIFICATION ENHANCEMENTS," filed Mar. 19, 2018, the contents of which are hereby incorporated by reference in their entirety for all purposes. This application is therefore entitled to a priority date of Mar. 19, 2018.

TECHNICAL FIELD

Various embodiments concern computer programs and associated computer-implemented techniques for intelligently processing content generated by electronic devices such as security cameras, security lights, etc.

BACKGROUND

Surveillance is the monitoring of behavior, activities, or other changing information for the purpose of influencing, managing, or protecting people/items in a given environment. Generally, surveillance requires that the given environment be monitored by means of electronic devices such as security cameras, security lights, etc. For example, a variety of electronic devices may be distributed through the home environment to detect activities performed in/around the home.

Wireless security cameras have proved to be very popular among modern consumers due to their low installation costs and flexible installation options. Moreover, many wireless security cameras can be mounted in locations that were previously unavailable to wired security cameras. Thus, consumers can readily set up home security systems for seasonal monitoring/surveillance (e.g., of pools, yards, garages, etc.).

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

FIG. 18A is a drawing illustrating a process performed in part by applying hash functions, in accordance with one or more embodiments of this disclosure.

Figure 1:
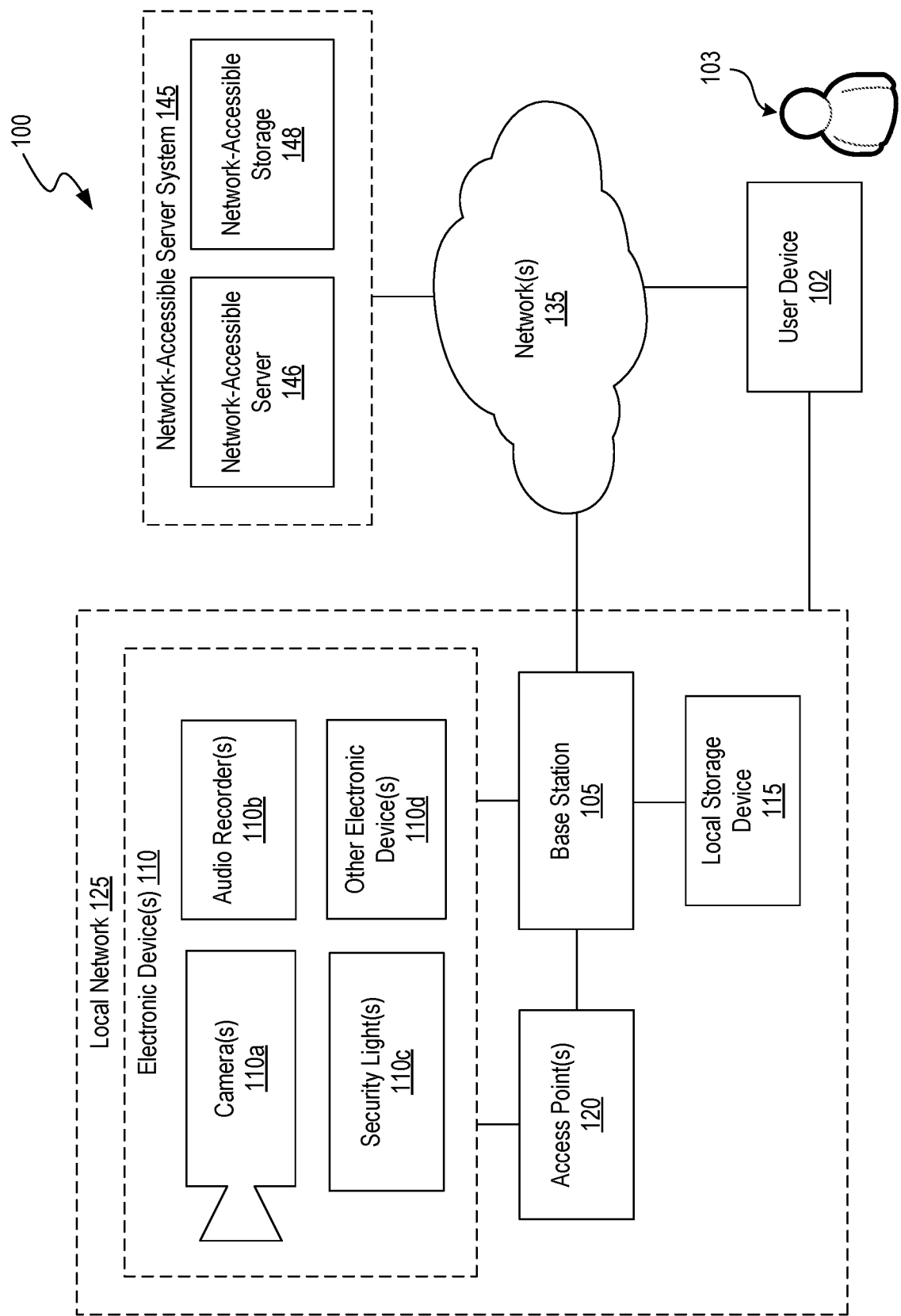
FIG. 1 is a diagram illustrating an example environment in which at least some operations described herein can be implemented.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Overview

Surveillance is the monitoring of behavior, activities, or other changing information for the purpose of influencing, managing, or protecting people/items in a given environment. Surveillance often requires that the given environment be monitored by means of various electronic devices such as security cameras, security lights, etc. In some instances, surveillance systems (also referred to as "security systems") are connected to a computer server via a network. Some content generated by a security system may be examined locally (i.e., by the security system itself), while other content generated by the security system may be examined remotely (e.g., by the computer server).

Generally, a network-connected surveillance system (also referred to as a "security system") includes a base station and one or more electronic devices. The electronic device(s) can be configured to monitor various aspects of a surveilled environment. For example, security cameras may be configured to record video upon detecting movement, while security lights may b e configured to illuminate the surveilled environment upon detecting movement. Different types of electronic devices can create different types of content. Here, for example, the security cameras may generate audio data and/or video data, while the security lights may generate metadata specifying a time at which each illumination event occurred, a duration of each illumination event, etc.

The base station, meanwhile, may be responsible for transmitting the content generated by the electronic device(s) to a network-accessible computer server. Thus, each electronic device may provide data to the base station, which in turn provides at least some of the data to the network-accessible computer server.

Nowadays, security systems support features such as high-quality video recording, live video streaming, two-way audio transmission, cloud-based storage of recordings, instant alerts, etc. These features enable individuals to gain an in-depth understanding of what activities are occurring within the environment being surveilled. However, security systems having these features also experience drawbacks.

For example, each electronic device in a security system is associated with a variety of adjustable parameters that affect how frequently alerts are generated by the security system. Examples of such parameters include motion detection sensitivity, audio sensitivity, luminance gain for night vision, electronic shutter speed, etc.

Generally, these parameters are adjusted during development of a given electronic device. However, these parameters are dependent on the hardware, firmware build, and ambient environment. As such, they need to be further adjusted once deployed in a surveillance environment. While individuals may attempt to manually vary these parameters (e.g., by interacting with customer support), automating a post-deployment optimization process would result in an increase in content quality, as well as a reduction in false positives/negatives in alerts generated by the security system.

Introduced herein is a technique for analyzing content generated by a network-connected security system to adjust parameters applied by the network-connected security system that addresses the challenges discussed above. In certain some embodiments, content generated by electronic device(s) can be analyzed at a base station, a network-connected computer server, other components associated with a security system, or any combination thereof.

Electronic devices distributed throughout various surveillance environments may collect millions of files (e.g., video clips, audio clips, metadata) each day. In some embodiments, these files can be analyzed in batches. More specifically, these files can be analyzed for collecting data on how well the corresponding security systems work, so that the adjustable parameters of the electronic devices responsible for generating the files can be improved, for example, by a network-connected computer server. Results of such analysis can be rolled into parameters, software modules, etc., which may be pushed to base stations for distribution to the electronic devices or to the electronic devices directly. When battery power is a significant concern, a network-connected computer server may periodically provide updated parameters to the (powered) base station, which can then push the updated parameters to any local electronic devices with minimal energy consumption.

In some embodiments, these adjustable parameters are optimized based on the characteristics of a single surveillance environment. Said another way, these parameters may be adjusted on an individual basis. In other embodiments, these adjustable parameters are optimized based on the characteristics of multiple surveillance environments. These surveillance environments may represent all surveillance environments known to the network-connected computer server. Alternatively, these surveillance environments may be associated with a cohort that includes the administrator. The cohort can include administrators that share a characteristic in common, such as geographical location, natural lighting levels, surveillance system topology (e.g., arrangement of electronic devices), etc. Accordingly, adjustable parameters may be optimized by a network-connected computer server based on characteristics of the administrator's surveillance environment and/or characteristics of other administrators' surveillance environments.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Example Operating Environment

FIG. 1 is a block diagram illustrating an example environment in which the introduced technique can be implemented. The example environment 100 includes a network-connected security system that includes base station 105 and one or more electronic devices 110 such as cameras 110a, audio recorder devices 110b, security lights 110c, or any other types of security devices.

The base station 105 and the one or more electronic devices 110 can be connected to each other via a local network 125. The local network 125 can be a local area network (LAN). In some embodiments, the local network 125 is a WLAN, such as a home Wi-Fi, created by one or more wireless accesses points (APs) 120. In some embodiments, functionality associated with base station 105 and/or wireless AP 120 are implemented in software instantiated at a wireless networking device. In other words, the system may include multiple wireless networking devices as nodes, wherein each of the wireless networking devices is operable as a wireless AP 120 and/or base station 105. The one or more electronic devices 110 and the base station 105 can be connected to each other wirelessly, e.g., over Wi-Fi, or using wired means. The base station 105 and the one or more electronic devices 110 can be connected to each other wirelessly via the one or more wireless APs 120, or directly with each other without the wireless AP 120, e.g., using Wi-Fi direct, Wi-Fi ad hoc or similar wireless connection technologies or via wired connections. Further, the base station 105 can be connected to the local network 125 using a wired means or wirelessly.

The one or more electronic devices 110 can be battery powered or powered from a wall outlet. In some embodiments, the one or more electronic devices 110 can include one or more sensors such as motion sensors that can activate, for example, the capturing of audio or video, the encoding of captured audio or video, and/or transmission of an encoded audio or video stream when motion is detected.

Cameras 110a may capture video, encode the video as a video stream, and wirelessly transmit the video stream via local network 125 for delivery to a user device 102. In some embodiments, certain cameras may include integrated encoder components. Alternatively, or in addition, the encoder component may be a separate device coupled to the camera 110a. For example, an analog camera may be communicatively coupled to the base station 105 and/or wireless AP 120 via an analog to digital encoder device (not shown in FIG. 1). In some embodiments, the base station 105 and/or wireless APs 120 may include encoding components to encode and/or transcode video. Encoder components may include any combination of software and/or hardware configured to encode video information. Such encoders may be based on any number of different standards such as H.264, H.265, VP8, VP9, Daala, MJPEG, MPEG4, Windows Media Video (WMV), etc., for encoding video information. Accordingly, depending on the codec used, the video stream from a given camera 110a may be one of several different formats such as .AVI, .MP4, .MOV, .WMA, .MKV, etc. The video stream can include audio as well if the camera 110a includes or is communicatively coupled to an audio device 110b (e.g., a microphone). In some embodiments, cameras 110a can include infrared (IR) light emitting diode (LED) sensors, which can provide night-vision capabilities.

Similarly, audio recording devices 110b may capture audio, encode the audio as an audio stream, and wirelessly transmit the audio stream via local network 125 for delivery to a user device 102. In some embodiments, certain audio recording devices may include integrated encoder components. Alternatively, or in addition, the encoder component may be a separate device coupled to the audio recording device 110b. For example, an analog audio recording device may be communicatively coupled to the base station 105 and/or wireless AP 120 via an analog to digital encoder device (not shown in FIG. 1). In some embodiments, the base station 105 and/or wireless APs 120 may include encoding components to encode and/or transcode audio. Encoder components may include any combination of software and/or hardware configured to encode audio information. Such encoders may be based on any number of different standards such as Free Lossless Audio Codec (FLAC), MPEG-4 Audio, Windows Media Audio (WMA), etc., for encoding audio information. Accordingly, depending on the codec used, the audio stream from a given camera 110a may be one of several different formats such as .FLAC, .WMA, .AAC, etc.

Although the example environment 100 illustrates various types of electronic devices 110a-d, the security system can include just a single type of electronic device (e.g., cameras 110a) or two or more different types of electronic devices 110 which can be installed at various locations of a building. The various electronic devices 110 of the security system may include varying features and capabilities. For example, some electronic devices 110 may be battery powered while another may be powered from the wall outlet. Similarly, some electronic devices 110 may connect wirelessly to the base station 105 while others rely on wired connections. In some embodiments, electronic devices of a particular type (e.g., cameras 110a) included in the security system may also include varying features and capabilities. For example, in a given security system, a first camera 110a may include an integrated night vision, audio recording, and motion sensing capabilities while a second camera 100a only includes video capture capabilities.

The base station 105 can be a computer system that serves as a gateway to securely connect the one or more electronic devices 110 to an external network 135, for example, via one or more wireless APs 120. The external network 135 may comprise one or more networks of any type including packet switched communications networks, such as the Internet, World Wide Web portion of the Internet, extranets, intranets, and/or various other types of telecommunications networks such as cellular phone and data networks, plain old telephone system (POTS) networks, etc.

The base station 105 can provide various features such as long range wireless connectivity to the electronic devices 110, a local storage device 115, a siren, connectivity to network attached storage (NAS), and enhance battery life for certain electronic devices 110, e.g., by configuring certain electronic devices 110 for efficient operation and/or by maintaining efficient communications between the base station 105 and such electronic devices 110. The base station 105 can be configured to store the content (e.g., audio and/or video) captured by some electronic devices 110 in any of the local storage device 115 or a network-accessible storage 148. The base station 105 can be configured to generate a sound alarm from the siren when an intrusion is detected by the base station 105 based on the video streams receive from cameras 110/112.

In some embodiments, the base station 105 can create its own network within the local network 125, so that the one or more electronic devices 110 do not overload or consume the network bandwidth of the local network 125. In some embodiments, the local network 125 can include multiple access points 120 to increase wireless coverage of the base station 105, which may be beneficial or required in cases where the electronic devices 110 are wirelessly connected and are spread over a large area.

In some embodiments the local network 125 can provide wired and/or wireless coverage to user devices (e.g., user device 102), for example, via APs 120. In the example environment 100 depicted in FIG. 1, a user device 102 can connect to the base station 105, for example, via the local network 125 if located close to the base station 105 and/or wireless AP 120. Alternatively, the user device 102 can connect to the base station 105 via network 135 (e.g., the Internet). The user device 102 can be any computing device that can connect to a network and play video content, such as a smartphone, a laptop, a desktop, a tablet personal computer (PC), or a smart TV.

In an example embodiment, when a user 103 sends a request (e.g., from user device 102), to access content (e.g., audio and/or video) captured by any of the electronic devices 110, the base station 105 receives the request and in response to receiving the request, obtains the encoded stream(s) from one or more of the electronic devices 110 and transmits the encoded stream to the user device 102 for presentation. Upon receiving the encoded stream at the user device 102, a playback application in the user device 102 decodes the encoded stream and plays the audio and/or video to the user 103, for example, via speakers and/or a display of the user devices 102.

As previously mentioned, in some embodiments, the base station 105 may include an encoding/transcoding component that performs a coding process on audio and/or video received from the electronic devices 110 before streaming to the user device 102. In an example embodiment, a transcoder at the base station 105 transcodes a stream received from an electronic device 100 (e.g., a video stream from a camera 110a), for example, by decoding the encoded stream and re-encoding the stream into another format to generate a transcoded stream that it then stream s to the user device 102.

The audio and/or video stream received at the user device 102 may be a real-time stream and/or a recorded stream. For example, in some embodiments, a transcoder may transcode an encoded stream received from an electronic device 110 and stream the transcoded stream to the user device 102 in real time or near real time (i.e., within several seconds) as the audio and/or video is captured at the electronic device 110. Alternatively, or in addition, audio and/or video streamed by base station 105 to the user device 102 may be retrieved from storage such as local storage 115 or a network-accessible storage 148.

The base station 105 can stream audio and/or video to the user device 102 in multiple ways. For example, the base station 105 can stream to the user device 102 using peer-to-peer (P2P) streaming technique. In P2P streaming, when the playback application on the user device 102 requests the stream, the base station 105 and the user device 102 may exchange signaling information, for example via network 135 or a network-accessible server system 145, to determine location information of the base station 105 and the user device 102, to find a best path and establish a P2P connection to route the stream from the base station 105 to the user device 102. After establishing the connection, the base station 105 streams the audio and/or video to the user device 102, eliminating the additional bandwidth cost to deliver the audio and/or video stream from the base station 105 to a network-accessible server computer 146 in a network-accessible server system 145 and for streaming from the network-accessible server computer 146 to the user device 102. In some embodiments, a network-accessible server computer 146 in the network-accessible server system 145 may keep a log of available peer node servers to route streams and establish the connection between the user device 102 and other peers. In such embodiments, instead of streaming content, the server 146 may function as a signaling server or can include signaling software whose function is to maintain and manage a list of peers and handle the signaling between the base station 105 and the user device 102. In some embodiments, the server 146 can dynamically select the best peers based on geography and network topology.

In some embodiments, the network-accessible server system 145 is a network of resources from a centralized third-party provider using Wide Area Networking (WAN) or Internet-based access technologies. In some embodiments, the network-accessible server system 145 is configured as or operates as part of a cloud network, in which the network and/or computing resources are shared across various customers or clients. Such a cloud network is distinct, independent, and different from that of the local network 125.

In some embodiments, the local network 125 may include a multi-band wireless network comprising one or more wireless networking devices (also referred to herein as nodes) that function as wireless APs 120 and/or a base station 105. For example, with respect to the example environment 100 depicted in FIG. 1, base station 105 may be implemented at a first wireless networking device that functions as a gateway and/or router. That first wireless networking device may also function as a wireless AP. Other wireless networking devices may function as satellite wireless APs that are wirelessly connected to each other via a backhaul link. The multiple wireless networking devices provide wireless network connections (e.g., using Wi-Fi) to one or more wireless client devices such as one or more wireless electronic devices 110 or any other devices such as desktop computers, laptop computers, tablet computers, mobile phones, wearable smart devices, game consoles, smart home devices, etc. The wireless networking devices together provide a single wireless network (e.g., network 125) configured to provide broad coverage to the client devices. The system of wireless networking devices can dynamically optimize the wireless connections of the client devices without the need of reconnecting. An example of the multi-band wireless networking system is the NETGEAR® Orbi® system. Such systems are exemplified in U.S. patent application Ser. No. 15/287,711, filed Oct. 6, 2016, and Ser. No. 15/271,912, filed Sep. 21, 2016, now issued as U.S. Pat.

No. 9,967,884 both of which are hereby incorporated by reference in their entireties for all purposes.

The wireless networking devices of a multi-band wireless networking system can include radio components for multiple wireless bands, such as 2.5 GHz frequency band, low 5 GHz frequency band, and high 5 GHz frequency band. In some embodiments, at least one of the bands can be dedicated to the wireless communications among the wireless networking devices of the system. Such wireless communications among the wireless networking devices of the system are referred to herein as "backhaul" communications. Any other bands can be used for wireless communications between the wireless networking devices of the system and client devices such as cameras 110 connecting to the system. The wireless communications between the wireless networking devices of the system and client devices are referred to as "fronthaul" communications.

Figure 2:
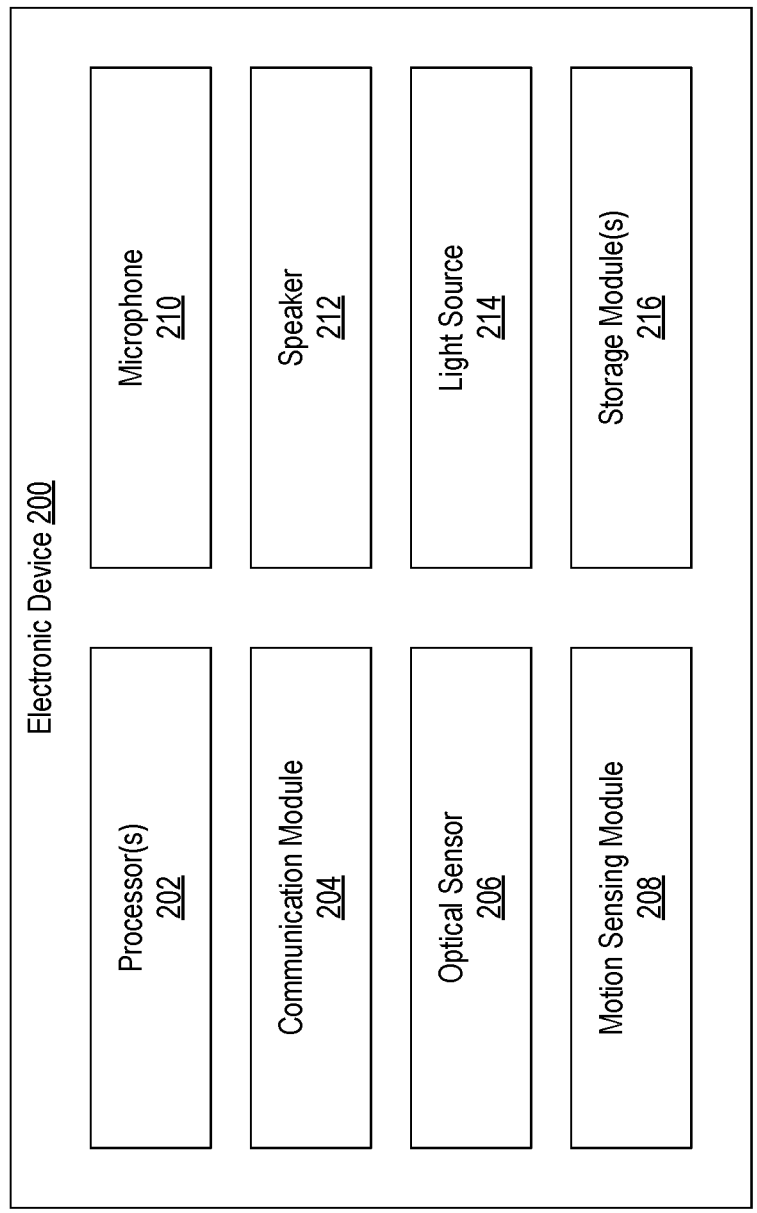
FIG. 2 is a diagram illustrating various functional components of an example electronic device configured to monitor various aspects of a surveilled environment.

FIG. 2 shows a high-level functional block diagram illustrating the architecture of an example electronic device 200 (e.g., similar to electronic devices 110 described with respect to FIG. 1) that monitors various aspects of a surveilled environment. As further described below, the electronic device 200 may generate content while monitoring the surveilled environment, and then transmit the content to a base station for further processing.

The electronic device 200 (also referred to as a "recording device") can include one or more processors 202, a communication module 204, an optical sensor 206, a motion sensing module 208, a microphone 210, a speaker 212, a light source 214, and one or more storage modules 216.

The processor(s) 202 can execute instructions stored in the storage module(s) 216, which can be any device or mechanism capable of storing information. In some embodiments, a single storage module includes multiple computer programs for performing different operations (e.g., image recognition, noise reduction, filtering), while in other embodiments each computer program is hosted within a separate storage module.

The communication module 204 can manage communication between various components of the electronic device 200. The communication module 204 can also manage communications between the electronic device 200 and a base station, another electronic device, etc. For example, the communication module 204 may facilitate communication with a mobile phone, tablet computer, wireless access point (WAP), etc. As another example, the communication module 204 may facilitate communication with a base station responsible for communicating with a network-connected computer server; more specifically, the communication module 204 may be configured to transmit content generated by the electronic device 200 to the base station for processing. As further described below, the base station may examine the content itself or transmit the content to the network-connected computer server for examination.

The optical sensor 206 (also referred to as "image sensors") can be configured to generate optical data related to the surveilled environment. Examples of optical sensors include charged-coupled devices (CCDs), complementary metal-oxide-semiconductors (CMOSs), infrared detectors, etc. In some embodiments, the optical sensor 206 is configured to generate a video recording of the surveilled environment responsive to, for example, determining that movement has been detected within the surveilled environment. In other embodiments, the optical data generated by the optical sensor 206 is used by the motion sensing module 208 to determine whether movement has occurred. The motion sensing module 208 may also consider data generated by other components (e.g., the microphone) as input. Thus, an electronic device 200 may include multiple optical sensors of different types (e.g., visible light sensors and/or IR sensors for night vision).

The microphone 210 can be configured to record sounds within the surveilled environment. The electronic device 200 may include multiple microphones. In such embodiments, the microphones may be omnidirectional microphones designed to pick up sound from all directions. Alternatively, the microphones may be directional microphones designed to pick up sounds coming from a specific direction. For example, if the electronic device 200 is intended to be mounted in a certain orientation (e.g., such that the camera 208 is facing a doorway), then the electronic device 200 may include at least one microphone arranged to pick up sounds originating from near the point of focus.

The speaker 212, meanwhile, can be configured to convert an electrical audio signal into a corresponding sound that is projected into the surveilled environment. Together with the microphone 210, the speaker 212 enables an individual located within the surveilled environment to converse with another individual located outside of the surveilled environment. For example, the other individual may be a homeowner who has a computer program (e.g., a mobile application) installed on her mobile phone for monitoring the surveilled environment.

The light source 214 can be configured to illuminate the surveilled environment. For example, the light source 214 may illuminate the surveilled environment responsive to a determination that movement has been detected within the surveilled environment. The light source 214 may generate metadata specifying a time at which each illumination event occurred, a duration of each illumination event, etc. This metadata can be examined by the processor(s) 202 and/or transmitted by the communication module 204 to the base station for further processing.

As previously discussed with respect to FIG. 1, electronic devices 110 may be configured as different types of devices such as cameras 110a, audio recording devices 110b, security lights 110c, and other types of devices. Accordingly, embodiments of the electronic device 200 may include some or all of these components, as well as other components not shown here. For example, if the electronic device 200 is a security camera 110a, then some components (e.g., the microphone 210, speaker 212, and/or light source 214) may not be included. As another example, if the electronic device 200 is a security light 110c, then other components (e.g., the camera 208, microphone 210, and/or speaker 212) may not be included.

Figure 3:
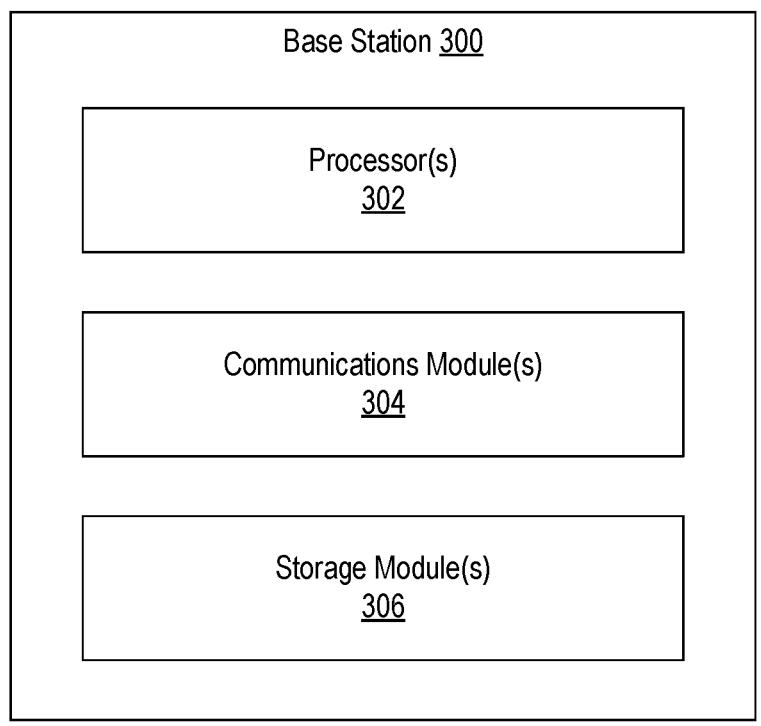
FIG. 3 is a diagram illustrating various functional components of an example base station associated with a network-connected security system configured to monitor various aspects of a surveilled environment.

FIG. 3 is a high-level functional block diagram illustrating an example base station 300 configured to process content generated by electronic devices (e.g., electronic device 200 of FIG. 2) and forward the content to other computing devices such as a network-connected computer server, etc.

The base station 300 can include one or more processors 302, a communication module 304, and one or more storage modules 306. In some embodiments, a single storage module includes multiple computer programs for performing different operations (e.g., image recognition, noise reduction, filtering), while in other embodiments each computer program is hosted within a separate storage module. Moreover, the base station 300 may include a separate storage module for each electronic device within its corresponding surveillance environment, each type of electronic device within its corresponding surveillance environment, etc.

Such a categorization enables the base station 300 to readily identify the content/data generated by security cameras, security lights, etc. The content/data generated by each type of electronic device may be treated differently by the base station 300. For example, the base station 300 may locally process sensitive content/data but transmit less sensitive content/data for processing by a network-connected computer server.

Thus, in some embodiments, the base station 300 processes content/data generated by the electronic devices, for example, to analyze the content to understand what events are occurring within the surveilled environment, while in other embodiments the base station 300 transmits the content/data to a network-connected computer server responsible for performing such analysis.

The communication module 304 can manage communication with electronic device(s) within the surveilled environment and/or the network-connected computer server. In some embodiments, different communication modules handle these communications. For example, the base station 300 may include one communication module for communicating with the electronic device(s) via a short-range communication protocol, such as Bluetooth® or Near Field Communication, and another communication module for communicating with the network-connected computer server via a cellular network or the Internet.

Figure 4:
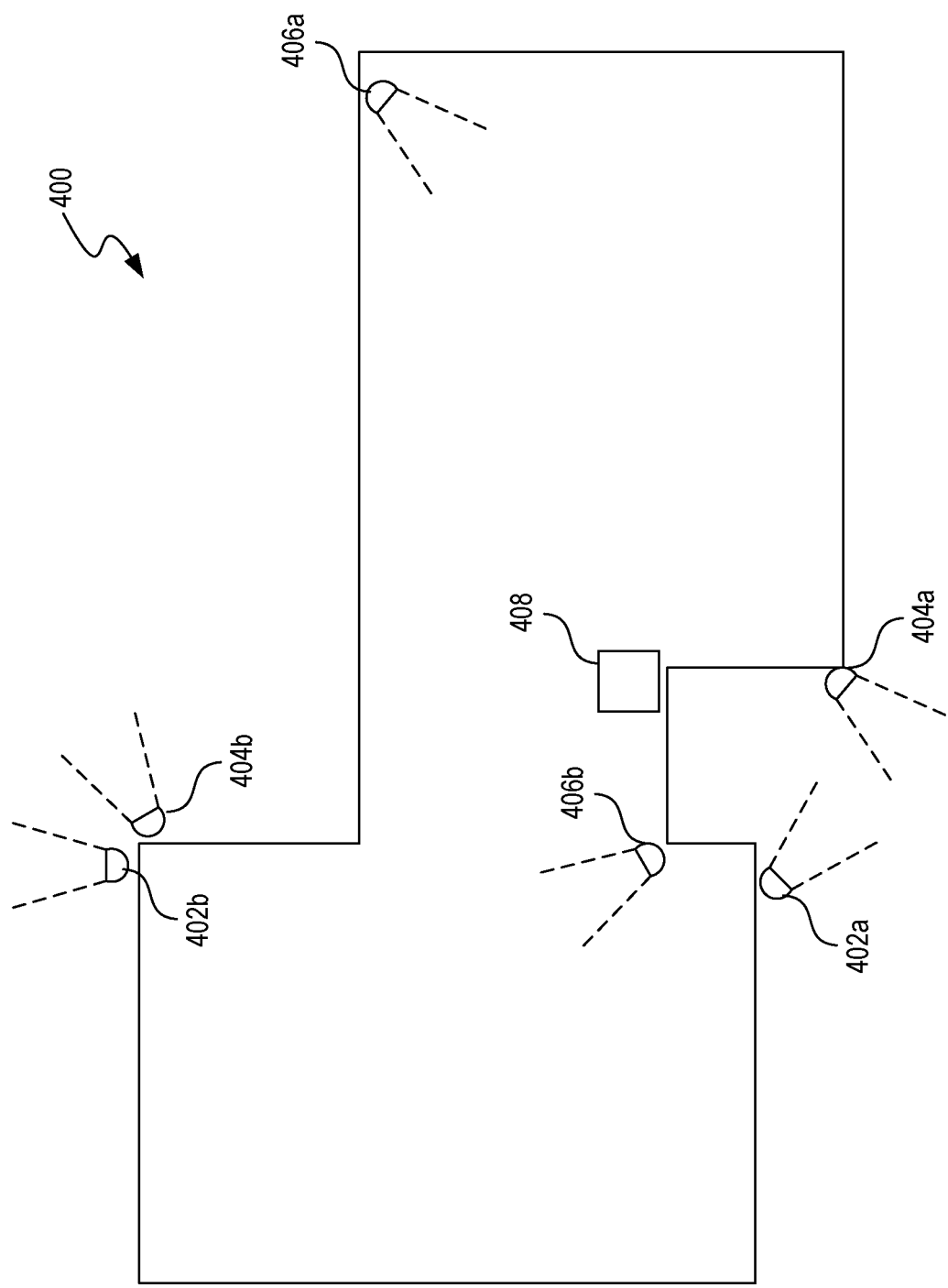
FIG. 4 is a plan view of a surveilled environment (e.g., a home) illustrating an example arrangement of devices associated with a network-connected security system.

FIG. 4 depicts a network security system that includes a variety of electronic devices configured to collectively monitor a surveilled environment 400 (e.g., the interior and exterior of a home). Here, the variety of electronic devices includes multiple security lights 402*a-b*, multiple external security cameras 404*a-b*, and multiple internal security cameras 406*a-b*. However, those skilled in the art will recognize that the network security system could include any number of security lights, security cameras, and other types of electronic devices. Some or all of these electronic devices are communicatively coupled to a base station 408 that can be located in or near the surveilled environment 400. Each electronic device can be connected to the base station 408 via a wired communication channel or a wireless communication channel.

Figure 5A:
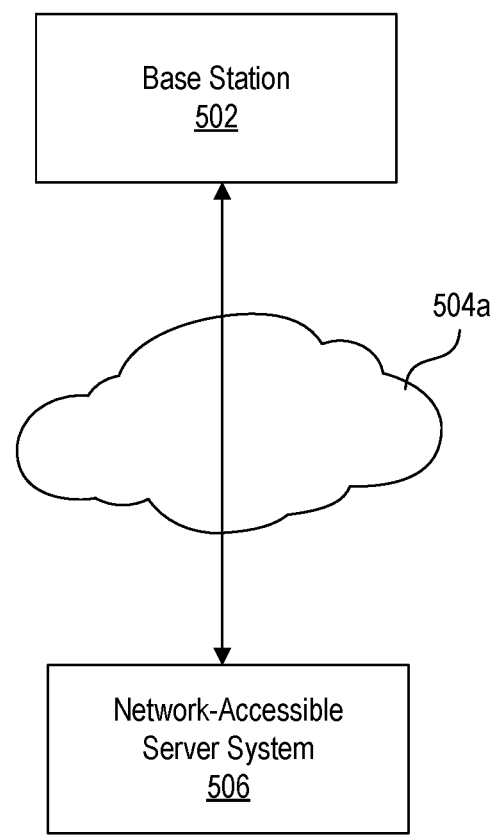
FIG. 5A is a diagram illustrating a network environment that includes a base station designed to receive content generated by one or more electronic devices arranged throughout a surveilled environment.

FIG. 5A illustrates an example network environment 500*a* that includes a base station 502 designed to receive content generated by one or more electronic devices arranged throughout a surveilled environment. The base station 502 can transmit at least some of the content to a network-accessible server system 506. The network-accessible server system 506 may supplement the content based on information inferred from content uploaded by other base station s corresponding to other surveilled environments.

The base station 502 and the network-accessible server system 506 can be connected to one another via a computer network 504*a*. The computer network 504*a* may include a personal area network (PAN), local area network (LAN), wide area network (WAN), metropolitan area network (MAN), cellular network, the Internet, or any combination thereof.

Figure 5B:
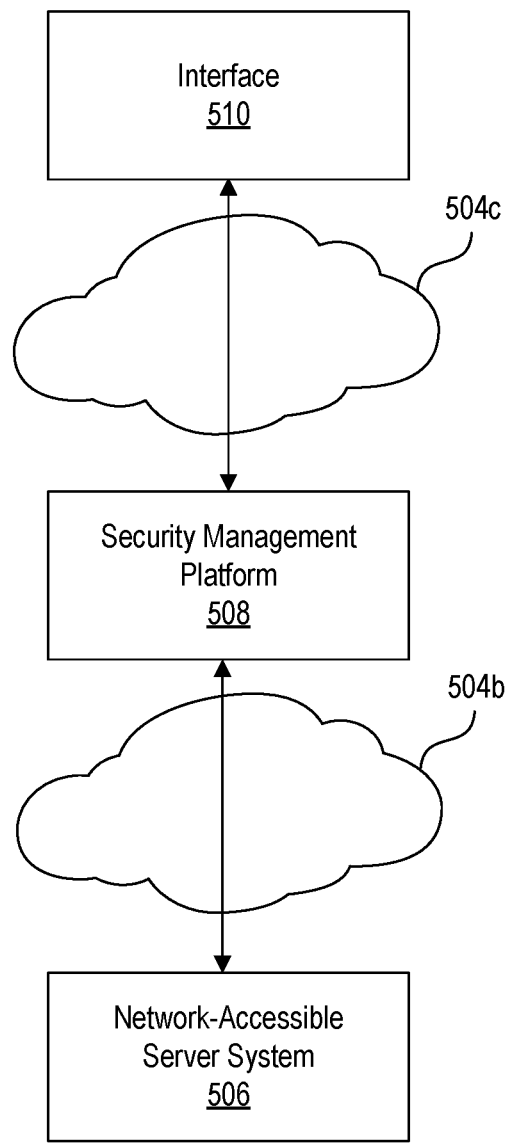
FIG. 5B is a diagram illustrating a network environment that includes a security management platform that is supported by the network-accessible server system.

FIG. 5B illustrates an example network environment 500*b* that includes a security management platform 508 that is supported by the network-accessible server system 506. Users can interface with the security management platform 508 via an interface 510. For example, a homeowner may examine content generated by electronic devices arranged proximate her home via the interface 510.

The security management platform 508 may be responsible for parsing content/data generated by electronic device(s) arranged throughout a surveilled environment to detect occurrences of events within the surveilled environment. The security management platform 508 may also be responsible for creating interfaces through which an individual can view content (e.g., video clips and audio clips), initiate an interaction within someone located in the surveilled environment, manage preferences, etc.

As noted above, the security management platform 508 may reside in a network environment 500*b*. Thus, the security management platform 508 may be connected to one or more networks 504*b-c*. Similar to network 504*a*, networks 504*b-c* can include PANs, LANs, WANs, MANs, cellular networks, the Internet, etc. Additionally, or alternatively, the security management platform 508 can be communicatively coupled to computing device(s) over a short-range communication protocol, such as Bluetooth® or NFC.

The interface 510 is preferably accessible via a web browser, desktop application, mobile application, or over-the-top (OTT) application. Accordingly, the interface 510 may be viewed on a personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device.

Electronic Device Parameters

As previously discussed, each electronic device in a security system may be associated with a variety of adjustable parameters that impact the effective operation of the security system. The types of parameters available to be adjusted will depend on the type of electronic device.

Adjustable parameters for video cameras 110*a* and/or audio recording devices 110*b* may include, for example, encoder parameters that impact how captured audio and/or video is encoded and/or transcoded. Encoder parameters include, for example, encoder profile, encoding standard (e.g., H.264, H.265, VP8, VP9, Daala, MJPEG, MPEG4, WMV, etc., for video), a codec based on any of the aforementioned standards, output format (e.g., .AVI, .MP4, .MOV, .WMA, .MKV, etc., for video), output resolution (for video), output bitrate (e.g., target bitrate, max bit rate, etc.), speed control parameters to manage quality vs. speed during the encoding process, quantization parameter (QP), frame rate (for video), group-of-pictures size (GOP) (for video), encoding techniques or algorithms to apply (e.g., context-based adaptive variable-length coding (CAVLC), context-based adaptive binary arithmetic coding (CABAC), etc.), rate control parameters (e.g., variable bitrate (VBR), constant bitrate (CBR), constant rate factor (CRF), constant quantization parameter (constant QP), etc.), one pass vs. multi-pass encoding, and any other such parameters that define how a piece of audio and/or video information is to be encoded.

A quantization parameter is indicative of compression of an encoded video stream. In some embodiments, the higher the quantization parameter the higher the compression of the encoded video stream and lower the file size of the encoded video stream.

A frame rate is a number of frames that appear every second, which is typically measured in frames per second (fps). In some embodiments, the higher the frame rate, the more frames per second are used to display the sequence of images, resulting in smoother motion. The trade-off for higher quality, however, is that higher frame rates require a larger amount of data, which uses more bandwidth.

A GOP size is a number of frames between two consecutive key frames. In some video encoding types, such as MPEG-4 and H.264, the video stream consists of I-frames (key frames), P-frames, and B-frames (collectively referred as "delta frames"). An I-frame or the key frame is a self-containing frame or complete video frame that does not need references to other frames. Each P-frame and B-frame uses references to previous I- or P-frames, and will contain only information about the content that is different compared to previous frames. The GOP stands for the number of frames between two I-frames. By increasing the length of GOP, there will be less I-frames per a certain amount of time. Since key frames are much bigger than delta frames by size, longer gaps between key frames can optimize the bandwidth consumption and storage space consumption. In some embodiments, the lower the GOP size the higher the bit rate and higher the file size of an encoded video stream.

A resolution of a video feed is indicative of a number of pixels used for recording the video feed. In some embodiments, the higher the resolution the higher the quality of the encoded video stream, the greater the file size of the encoded video stream and greater the network bandwidth consumed in transmission of the encoded video stream. For example, a High-Definition (HD) or 720p resolution uses 1280×720 pixels, a full HD or 1080p resolution uses 1920×1080, and a 4K resolution uses 3840×2160 pixels.

Adjustable parameters for video cameras 110a may also include optical parameters such as focal length, aperture, sensitivity (e.g., ISO), shutter speed, exposure, and/or image processing parameters such as white balance, image noise level, etc., that impact the capture of images and video.

Focal length refers to the distance between the center of a lens (or system of lenses and mirrors) and its focus. Longer focal length leads to higher magnification and a narrower angle of view; conversely, shorter focal length is associated with lower magnification and a wider angle of view. The focal length can be adjusted, for example, by moving an optical sensor relative to the lens (e.g., as in certain video camera systems, equipped with zoom lenses).

Aperture refers the space through which incident light passes in a video camera. The aperture can be adjusted in certain video camera systems equipped with a variable aperture mechanism.

Sensitivity refers to a measure of the optical sensors' sensitivity to light in a digital video camera. Sensitivity is sometimes set based on an ISO value. The lower the ISO value, the less sensitive the sensor is to light. High ISO values, on the other hand, increase the sensitivity of the optical sensor enabling the capture of quality images even in low light conditions. An ISO for a video camera can be adjusted, for example, by adjusting amplification when converting the light detected by the optical sensor to an analog electrical signal or digital signal.

Exposure refers to the amount of light per unit of area reaching the optical sensor. In some cases, exposure for a given image can be measured as a cumulative function of intensity values across the image. In some embodiments, adjusting an exposure parameter may include adjusting parameters for any of shutter speed, aperture, and sensitivity.

White balance (or more generally color balance) refers to the neutralization of the color of an illuminant present when capturing an image. When capturing an image, the dominant light source (e.g., the sun during the day) produces a color that affects the appearance of scene objects captured in the image. The color cast by the dominant light source affects the color normally associated with white by a human viewing the image. Adjusting white balance can include, for example, identifying a color of the illuminant (i.e., the dominant light source) and adjusting the color levels (e.g., by adjusting image processing parameters) to neutralize the identified color of the illuminant. Identifying the color of the illuminant in captured images may include, for example, identifying the brightest pixel (or pixels) in the image and determining the color of those pixels since highlights tend to have the color of the illuminant.

Adjustable parameters for other types of electronic devices may include, for example, sensitivity/thresholds (during the day and night) for motion detection devices, light-emitting diode (LED) lux for security lights, etc.

The aforementioned electronic device parameters associated with a security system are just examples provided for illustrative purposes. A person having ordinary skill in the art will recognize that other parameters may similarly be adjusted and optimized using the introduced technique.

Adjusting Electronic Device Parameters Based on Analysis of Content

Figure 6:
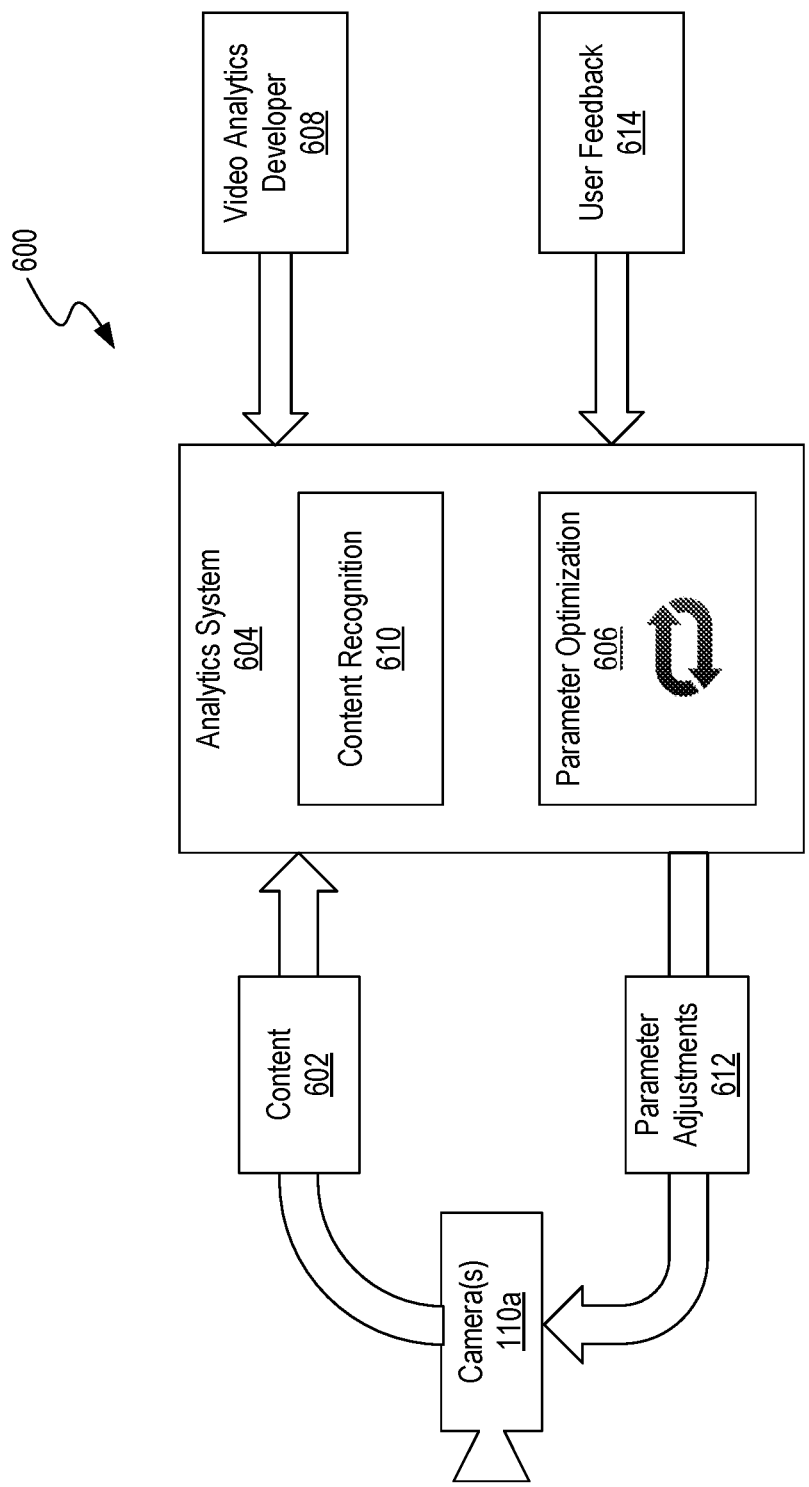
FIG. 6 is an architecture flow diagram illustrating an environment including an analytics system for adjusting parameters in a network-connected security system based on analysis of content generated at electronic devices in the network-connected security system.

FIG. 6 shows a flow diagram illustrating an example process 600 for adjusting one or more parameters associated with electronic devices in a network-connected security system. Some or all of the steps described with respect to FIG. 6 may be executed at least in part by an analytics system 604 deployed on a base station 105, at a network-accessible server system 145, at one or more electronic devices 110, or any combination thereof. In other words, the analytics system 604 depicted in FIG. 6 refers to a functional entity that may include hardware and/or software elements at any one or more of the components depicted in the example operation environment 100 depicted in FIG. 1. Further, while the embodiment is described in the context of a security camera, those skilled in the art will recognize that similar techniques could also be employed with other types of electronic devices.

Initially, one or more security cameras 110a generate content 602, for example, by capturing video and encoding the captured video into digital information. The content 602 may include, for example, one or more digital files including the encoded video.

The content 602 is then fed into an analytics system 604 for processing according to the introduced technique. In some embodiments, the step of feeding the content 602 into the analytics system 604 may include a camera 110a transmitting the generated content 602 over a computer network (e.g., a wired or wireless local network 125) to a base station 105. The base station 105 may then forward the received content 602 to a network-accessible server system 145 that implements the analytics system 604. Alternatively, or in addition, the camera 110a and/or base station 105 may include processing components that implement at least a portion of the analytics system 604.

In some embodiments, content 602 is fed into the analytics system 604 continually as it is generated. For example, in some embodiments, the camera 110a may generate a digital video continuous stream that is transmitted to the analytics system 604 for storage and processing by way of the base station 105.

Alternatively, the camera 110a may be configured to generate content 602 at periodic intervals and/or in response to detecting certain conditions or events. For example, the camera 110a may be equipped with, or in communication with, a motion detector that triggers the capturing and encoding of video when motion in the surveilled environment is detected. In response to receiving an indication of detected motion, the camera 110a may begin generating content 602 by capturing video and encoding the captured video. As another illustrative example, instead of transmitting a continuous stream of content 602, the video camera 110a may transmit small portions of content (e.g., short video clips or still images) at period intervals (e.g., every few seconds).

In some embodiments, content 602 is fed into the analytics system 604 periodically (e.g., daily, weekly, or monthly) or in response to detected events. For example, even if the content 602 is continually generated, such content 602 may be held in storage (e.g., at local storage 115 or a NAS 148) before being released (periodically or in response to detected events) for analysis by the analytics system 604.

Thereafter, a parameter optimization routine 606 is initiated at the analytics system 604 to process the content 602 and select values for one or more parameters based on the analysis. In some embodiments, a video analytics developer 608 may initiate the parameter optimization routine 606 at the analytics system 604. Alternatively, or in addition, the analytics system 604 may initiate automatically the parameter optimization routine 606, for example, in response to detecting a certain condition (e.g., receiving a certain number of video clips, determining a certain amount of time has elapsed since the most recent execution of the parameter optimization routine, etc.).

In some embodiments, processing of content 602 may include a content recognition process 610 to gain some level of understanding of the information captured in the content 602. For example, the content recognition process 610 may be applied to classify the received content into general categories such as "good quality" or "bad quality" based on some specified objective and/or subjective criteria. For example, the analytics system 604 may be configured to classify content 602 (e.g., video) that exhibits contrast levels below a specified threshold as "low quality" which can inform the parameter optimization routine 606 how to adjust certain parameters to increase the contrast levels above the specified threshold. Such a process may similarly be applied to classify received audio clips as of "good quality" or "bad quality."

Figure 7:
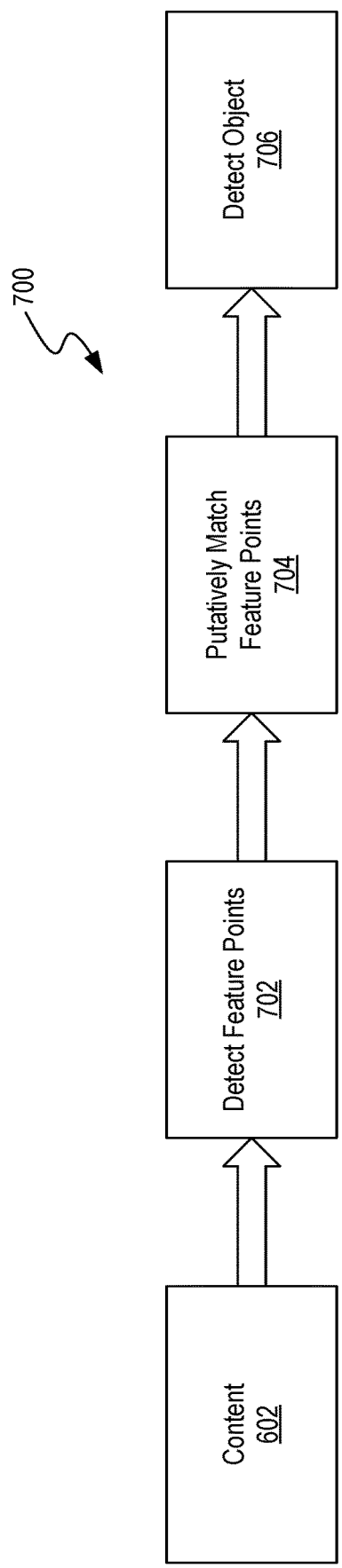
FIG. 7 is a flow diagram illustrating an example process for detecting objects in captured image or video content.

In some embodiments, the content recognition process 610 may apply computer vision techniques to detect physical objects captured in the content 602. FIG. 7 shows a flow diagram that illustrates an example high-level process 700 for image processing-based object detection that involves, for example, processing content 602 to detect identifiable feature points (step 702), identifying putative point matches (step 704), and detecting an object based on the putative point matches (step 706).

The content recognition process 610 may further classify such detected objects. For example, given one or more classes of objects (e.g., humans, buildings, cars, animals, etc.), the content recognition process 610 may process the video content 602 to identify instances of various classes of physical objects occurring in the captured video of the surveilled environment.

In some embodiments, the content recognition process 610 may employ deep learning-based video recognition to classify detected objects. In an example deep learning-based video recognition process for detecting a face, raw image data is input as a matrix of pixels. A first representational layer may abstract the pixels and encode edges. A second layer may compose and encode arrangements of edges, for example, to detect objects. A third layer may encode identifiable features such as a nose and eyes. A fourth layer may recognize that the image includes a face based on the arrangement of identifiable features.

Figure 8:
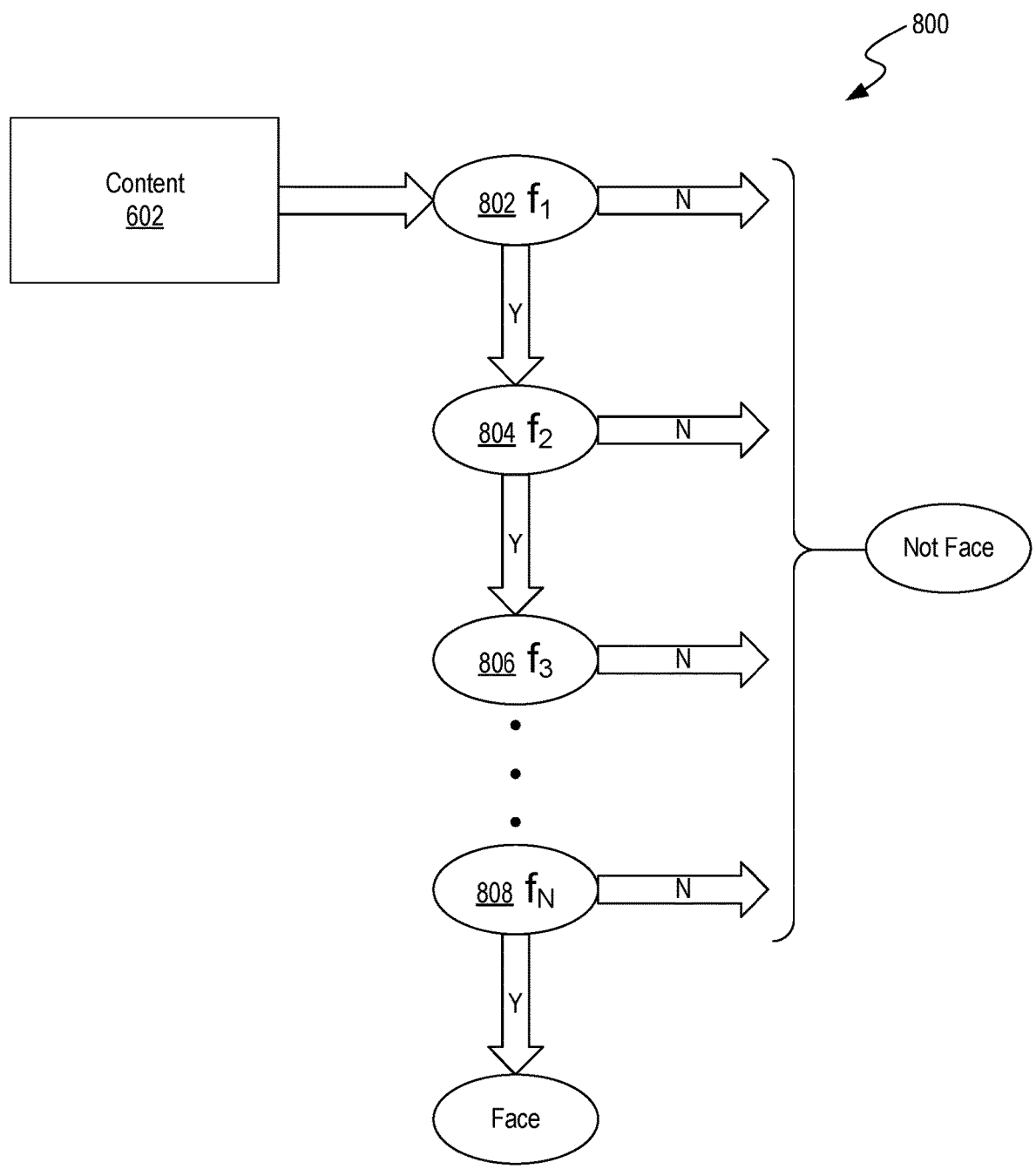
FIG. 8 is a flow diagram illustrating an example process for classifying objects detected in captured image or video content.

An example technique for classifying objects detected in images or video is the Haar Cascade classifier. FIG. 8 shows a flow diagram that illustrates an example high-level process 800 applied by a Haar Cascade classifier, specifically for classifying an object in a piece of content 602 as a face. As shown in FIG. 8, the content 602 (or a portion thereof) is fed into a first level process 802 which determines whether an object that can be classified as a face is present in the content 602. If, based on the processing at the first stage 802, it is determined that content 602 does not include an object that can be classified as a face, that object is immediately eliminated as an instance of a face. If, based on the processing at the first stage 802, it is determined that content 602 does include an object that can be classified as a face, the process 800 proceeds to the next stage 804 for further processing. Similar processes are applied at each stage 804, 806 and so on to some final stage 808.

Notably, each stage in the example process 800 may apply increasing levels of processing which requiring increasingly more computational resources. A benefit of this cascade technique is that objects that are not faces are immediately eliminated as such at higher stages with relatively little processing. To be classified as a particular type of object (e.g., face detection), the content must pass each of the stages 802-808 of the classifier.

Note that the example Haar Cascade classifier process 800 depicted in FIG. 8 is for classifying detected objects as faces; however, similar classifiers may be trained to detect other classes of objects (e.g., car, building, cat, tree, etc.).

Returning to FIG. 6, the content recognition process 610 may also include distinguishing between instances of detected objects. This is sometimes referred to as instance segmentation. For example, a grouping method may be applied to associate pixels corresponding to a particular class of objects to a particular instance of that class by selecting pixels that are substantially similar to certain other pixels corresponding to that instance, pixels that are spatially clustered, pixel clusters that fit an appearance-based model for the object class, etc. Again, this process may involve applying a deep learning (e.g., through applying a convolutional neural network) to distinguish individual instances of detected objects. Some example techniques that can be applied for identifying multiple objects include Regions with Convolutional Neural Network Features (RCNN), Fast RCNN, Single Shot Detector (SDD), You Only Look Once (Yolo), etc.

The content recognition process 610 may also include recognizing the identity of detected objects (e.g., specific people). For example, the analytics system 604 may receive inputs (e.g., captured images/video) to learn the appearances of instances of certain objects (e.g., specific people) by building machine-learning appearance-based models. Instance segmentations identified based on processing of content 602 can then be compared against such appearance-based models to resolve unique identities for one or more of the detected objects. Identity recognition can be particularly useful in this context as it may allow the system to adjust parameters to improve image quality, for example when unknown individuals are captured, while adjusting parameters to allow for lower image quality, for example when known individuals such as family members are captured, thereby conserving computing resources (e.g., storage space, network capacity) for content that contains critical information.

The content recognition process 610 may also include fusing information related to detected objects to gain a semantic understanding of the captured scene. For example, the content recognition process 606 may include fusing semantic information associated with a detected object with geometry and/or motion information of the detected object to infer certain information regarding the scene. Information that may be fused may include, for example, an object's category (i.e., class), identity, location, shape, size, scale, pixel segmentation, orientation, inter-class appearance, activity, and pose. As an illustrative example, the content recognition 606 process may fuse information pertaining to one or more detected objects to determine that a clip of video is capturing a known person (e.g., a neighbor) walking their dog past a house. The same process may be applied to another clip to determine that the other clip is capturing an unknown individual peering into a window of a surveilled house. The analytics system 604 can then use such information to generate parameter adjustments accordingly.

In some embodiments, labeled image data (e.g., historical video from one or more sources) may be input to train a neural network (or other machine-learning based models) as part of the content recognition process 610. For example, security experts may input previously captured video from a number of different sources as examples of good quality video and bad quality video and/or examples of certain classes of objects (e.g., car, building, cat, tree, etc.) to inform the content recognition process 610.

Based on the processing of content 602 according to the parameter optimization process 606, the analytics system 604 determines one or more parameter settings for one or more of the electronic devices 110 (e.g., camera 110a). The analytics system 604 then transmits parameter adjustments 612 that are based on the determined parameter settings to the one or more electronic devices 110 (e.g., camera 110a) to improve operation of the networked security system.

The parameter optimization process 606 may be configured to determine one or more parameter settings that will most result in content that most closely matches some set of one or more criteria. Criteria used to determine optimal parameter settings may include, for example, user device compatibility criteria, video-quality-based criteria (e.g., minimum quality, range of acceptable quality, etc.), latency-based criteria (e.g., maximum delay, range of acceptable delay, etc.), resource usage criteria (e.g., maximum file size, maximum CPU usage, maximum memory usage, etc.), cost-based criteria (e.g., royalty-free, maximum royalty costs, maximum cloud costs, etc.), user subscription criteria (e.g., required user permission level), or any other type of criteria upon which an assessment of content 602 may be based.

In some embodiments, criteria applied by the parameter optimization process may b e based on the types of objects detected in the content. For example, as alluded to above, certain objects (e.g., unknown people) may be of greater interest in a security context and may therefor warrant higher quality video than other types of objects (e.g., stationary objects such as trees or buildings, or known people or pets). As an illustrative use case, parameter optimization process 606 may be configured to lower a quantization parameter (thereby retaining more image data) when certain objects such as a human face, a pet, or a car license plate are detected. Conversely, the parameter optimization process 606 may be configured to increase the quantization parameter (thereby discarding more image data) when other types of objects such as clouds, trees, or birds, are detected.

In some embodiments, criteria used to perform the parameter optimization process 606 can be specified at system installation and remain static or can be dynamically adjusted over time, for example, based on user input preferences, system-provider updates, and/or based on machine learning. For example, analytics system 604 may identify, by applying a deep learning-based content recognition process 610, that applying certain criteria to set parameter values leads to better results in perceived quality of content, overall system performance, implementation costs, or any other performance metric.

In some embodiments, multiple selection criteria may be weighted differently when applied during the parameter optimization process 606. For example, certain selection criteria deemed more important (e.g., video quality) may be weighted more heavily than other selection criteria (e.g., resource usage).

In some embodiments, parameter adjustments 612 may comprise updated values for one or more parameter settings that can be read by either base station 105 or the one or more electronic devices 110 and then utilized to reconfigure the one or more electronic devices. As an illustrative example, the analytics system 604 may determine, based on the processing of content 602, that the overall effectiveness of video surveillance would improve (e.g., through improving video quality) by changing the target bitrate applied by an encoder at a camera 110a from a current first value to a second value that is different than the first value. To cause this change, the analytics system 604 may transmit a message (e.g., over a computer network) that includes the updated second value for the target bitrate parameter to the base station 105 or directly to the camera 110a. If transmitted to the base station 105, the base station 105 may receive the message, interpret the message to determine the updated second value for the target bitrate parameter and utilize that updated second value to reconfigure one or more video encoders (at cameras 110a or at the base station 105) that are utilized to encode video captured by one or more of the cameras.

In some embodiments, parameter adjustments 612 may comprise a software module configured based on updated values for one or more parameter settings. As an illustrative example, the analytics system 604 may determine, based on the processing of content 602, that the overall effectiveness of video surveillance would improve (e.g., through improving video quality) by utilizing a different codec to encode captured video. To cause this change, the analytics system 604 may transmit a software module including an updated codec to the base station 105 or directly to the camera 110a. The software module containing the updated codec may be a pre-existing software module or may be compiled or otherwise generated (by the analytics system 604 or another computer processing system) in response to performing the parameter optimization process 606.

Parameter adjustments 612 may be pushed by the analytics system 604 to the base station 105 or the one or more electronic devices 110 continually, as needed, at periodic intervals, and/or in response to detecting certain events or conditions. Alternatively, or in addition, the analytics system 604 may transmit parameter adjustments 612 in response to receiving requests from the base station 105 and/or the one or more electronic devices 110.

In some embodiments, parameter adjustments 612 may be sent by the analytics system 604 to all electronic devices 110, at least of a particular type (e.g., cameras 110a). For example, the analytics system may determine an updated value for a particular parameter (e.g., target bitrate) and may transmit a parameter adjustment 612 to update all cameras 110a associated with a particular security system or multiple security systems.

Alternatively, or in addition, parameter adjustments 612 may be provided on a more selective basis. For example, the analytics system 604 may identify those security cameras 110a in similar surveilled environments based, for example, on environmental characteristics such as ambient light level, event frequency, the presence of pets and/or children, geographical location, etc. In such embodiments, the analytics system 604 may only transmit certain parameter adjustments 612 to those base stations 105 corresponding to security cameras 110*a* in similar surveilled environments. Such action ensures that security cameras 110*a* in dissimilar surveilled environments (e.g., brightly lit backyards and dimly lit alleys) do not receive the same parameter adjustments.

In some embodiments, analytics system 604 may utilize user feedback 614 provided by one or more users when performing the parameter optimization process 606. For example, feedback 614 from one or more end users may indicate content that users consider desirable, helpful, or otherwise of high quality. The analytics system 604 may utilize such feedback, for example, to a deep learning-based content recognition process or to set or weight parameter selection criteria as part of the parameter optimization process 606.

In some embodiments, user feedback 614 is collected from all users of associated security systems and aggregated by the analytics system 604 before being utilized to inform the parameter optimization process 606. Alternatively, or in addition, user feedback 614 can be collected and aggregated based on cohorts of users that share some characteristic in common such as geographic location, security system type and configuration, demographic information, etc. For example, when performing the parameter optimization process 606, the analytics system 604 may consider user feedback 614 from a particular cohort of users such as users within a particular neighborhood. The analytics system 604 may then transmit parameter adjustments 612 generated based on the user feedback from the cohort of users specifically to base stations 105 associated with security systems of the cohort of users.

Figure 9:
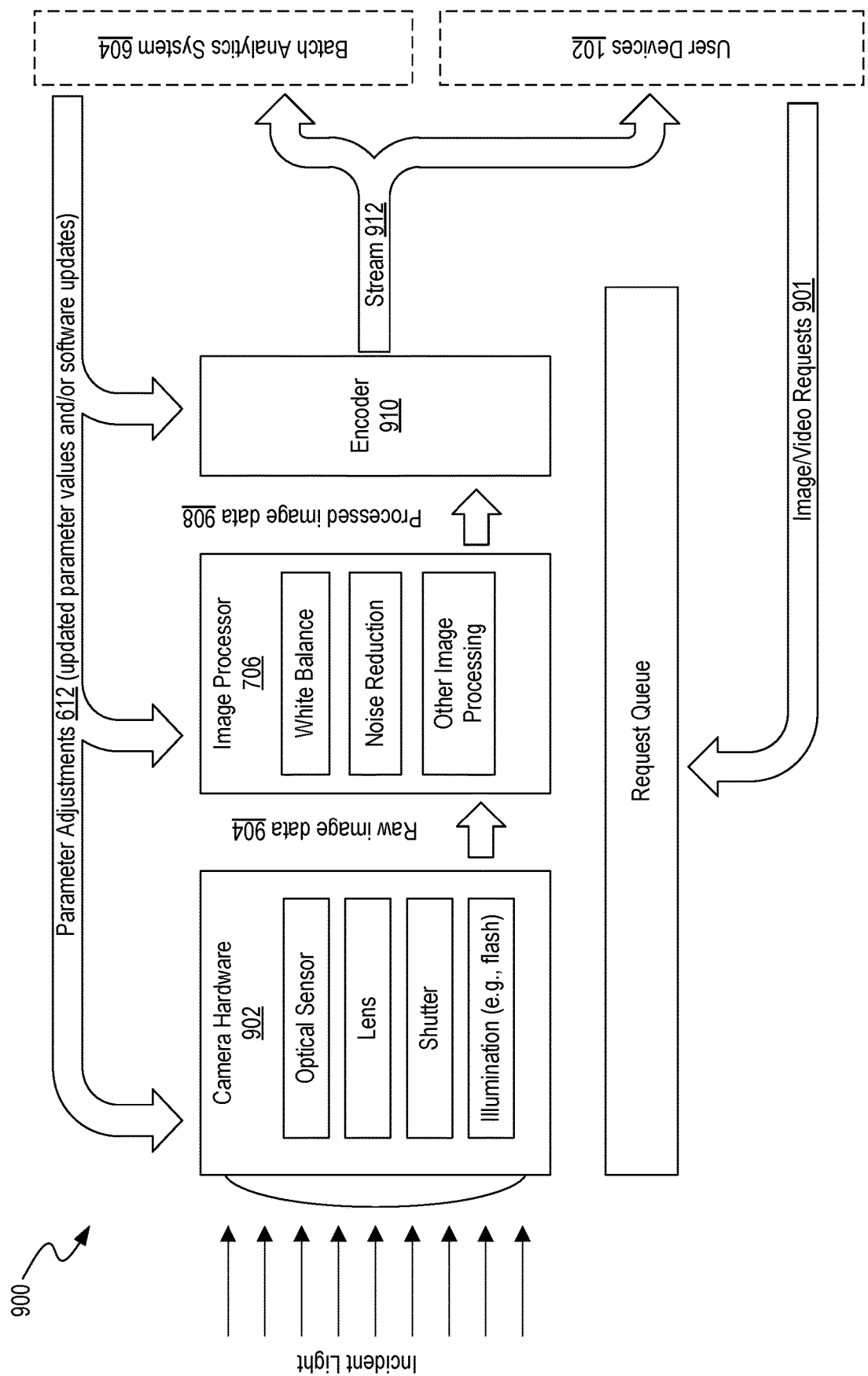
FIG. 9 is an architecture flow diagram illustrating how parameters can be adjusted in a network-connected security system.

FIG. 9 shows a diagram of an example architecture 900 of an electronic device 110 in the form of a camera 110*a* that illustrates how parameter adjustments may be input to the electronic device. As shown in FIG. 9, a video camera 110*a* may comprise camera hardware 902 such as one or more optical sensors, lenses, mechanical shutters, and illuminating devices (e.g., an LED flash).

To receive a video stream from a video camera 110*a* of the networked security system, a request 901 may be received, for example, based on a user input received via an interface 510 presented at the user device 102 by a security management platform 508.

The received request causes the camera hardware 902 to capture images of the surveilled environment based on incident light. The output from the camera hardware 902 may comprise raw image data. This raw image data may be output to an image processor 904, for example, to perform various processes such as auto white balance, noise reduction, and other digital image processing. The processed image data 908 is then output to an encoder which converts the processed image data into an encoded stream which can then be transmitted over a computer network to the base station 105 and eventually on to a user device 102 originating the request as well as the analytics system 604 for parameter optimization. Note that the image processor 906 and encoder 910 are depicted in FIG. 9 as separate components from the camera hardware 920; however, in some embodiments, image processor 906 and/or encoder 910 may comprise, at least in part, hardware such as a physical processing unit and a physical memory device storing instructions for performing image processing and encoding functions.

The content 602 submitted to the analytics system 604 will typically include the encoded stream 912 that is transmitted over a computer network, for example, via base station 105. However, in some embodiments, the content 602 may include, alternatively or in addition, the raw image data 904 and/or processed image data 908. For example, depending on the architecture of the security system, an analytics system 604 may be configured to receive and analyze raw image data 904 and processed image data 908, for example, to determine how certain combinations of optical parameters, image processing parameters, and/or encoder parameters impact the quality of output. Based on this analysis, the analytics system 604 may determine an optimal combination of optical, image processing, and/or encoder parameters to apply to maximize video quality.

As previously discussed with respect to FIG. 6, the analytics system 604 may return one or more parameter adjustments 612, for example, in the form of updated parameter values and/or updated software modules. Further, as shown in FIG. 9, these parameter adjustments 612 may update any one or more of optical parameters, image processing parameters, and/or encoder parameters associated with an electronic device 110, specifically a camera 110*a*.

In some embodiments, a given set of parameter adjustments 612 based on an analysis of content 612 may include updates to various subcomponents of the electronic device 110*a* and may include different types of adjustments. For example, based a parameter optimization process 606, the analytics system 604 may determine an optimal set of parameters that include an updated optical parameter (e.g., an updated ISO setting for the optical sensor), an updated image processing parameter (e.g., an updated illuminant color for auto white balance), and an updated encoder parameter (e.g., an updated encoder profile). In the illustrative example, the analytics system 604 may transmit the parameter adjustments 612 as a combination of messages including updated parameter values (e.g., a message including an updated illuminant color) and software modules (e.g., a software module including an updated codec).

Figure 10:
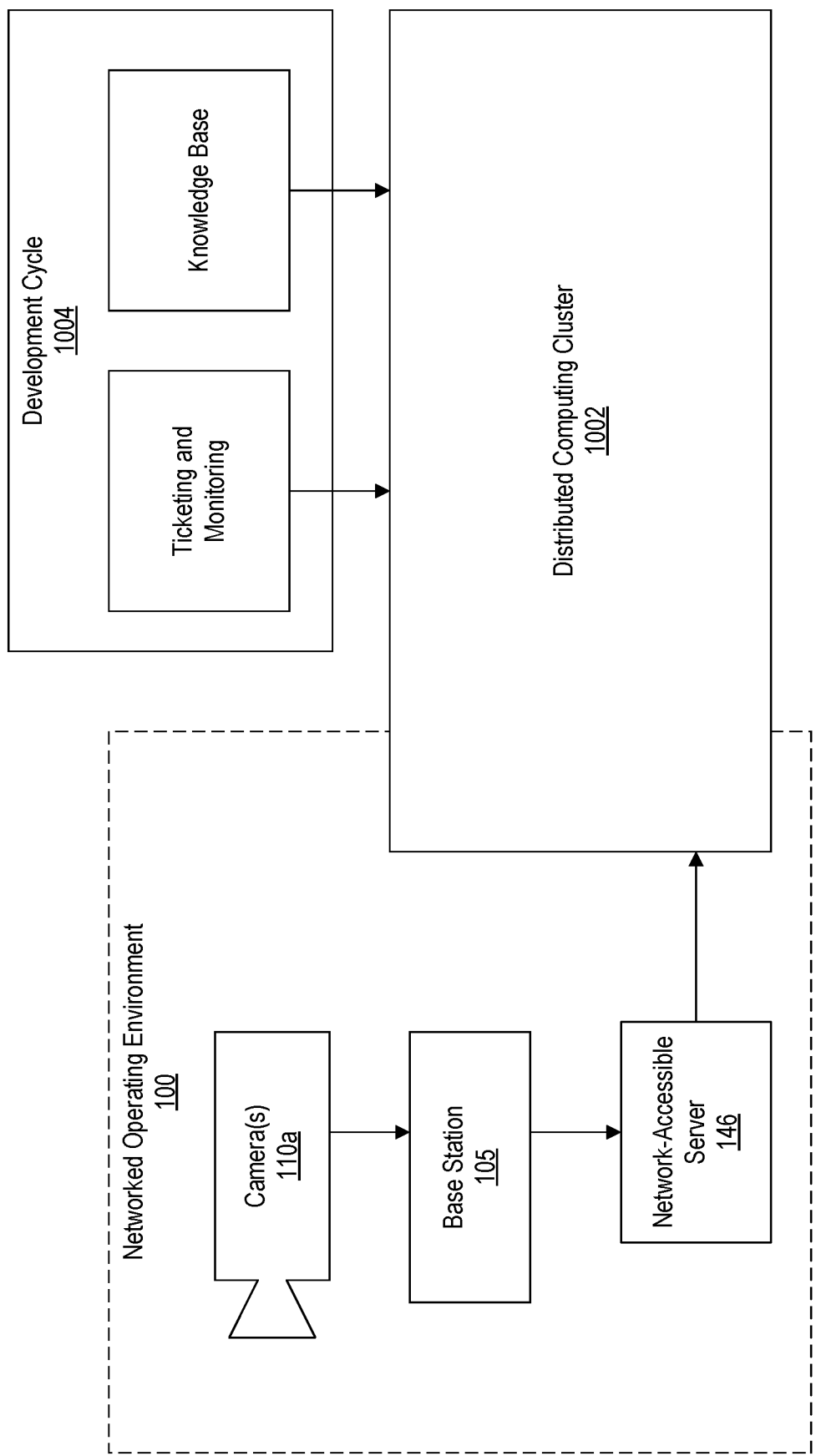
FIG. 10 is a diagram illustrating how a distributed computing cluster can be utilized to process content.

Various programming models and associated techniques for processing/generating big data sets can be applied by the analytics system 604 to process content 602 and generate parameter adjustments 612. For example, in some embodiments, analytics system 604 may utilize a distributed computing cluster to process content 602. Utilizing a distributed computing architecture can be particularly beneficial when processing large amounts of data such as content received from a security system or multiple security systems. FIG. 10 illustrates how various inputs such as content 602 (e.g., video clips, keystrokes) and session metadata may be received from base station(s) 105, for example, via a network-accessible server 146 and fed into a distributed computing cluster 1002. In some embodiments, input data from a development cycle 1004 such as ticketing/monitoring information and/or information stored in a knowledge base may also b e input to the distributed computing cluster 1002.

The distributed computing cluster 1002 may represent a logical entity that includes sets of host machines (not shown in FIG. 8) that run instances of services configured for distributed processing of data. In an example embodiment, the distributed computing cluster 1002 may comprise an Apache Hadoop™ deployment. Apache Hadoop™ is an open-source software framework for reliable, scalable and distributed processing of large data sets across clusters of commodity machines. Examples of services/utilities that can be deployed in an Apache Hadoop™ cluster include the Apache Hadoop™ Distributed File System (HDFS), MapReduce™, Apache Hadoop™ YARN, and/or the like. The host computing devices comprising the computing cluster 1002 can include physical and/or virtual machines that run instances of roles for the various services/utilities. For example, the Apache™ HDFS service can have the following example roles: a NameNode, a secondary NameNode, DataNode, and balancer. In a distributed system such as computing cluster 1002, one service may run on multiple host machines.

Figure 11:
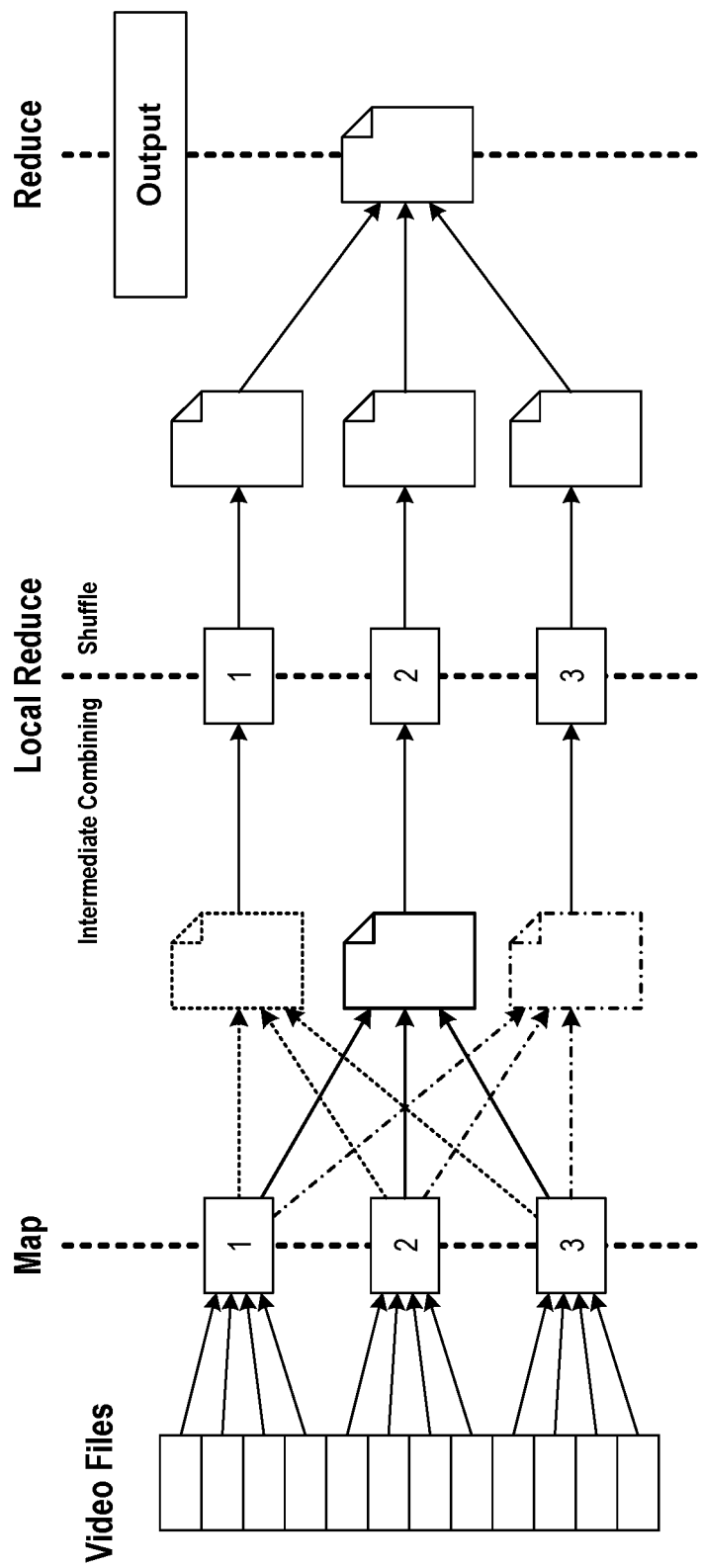
FIG. 11 is a diagram illustrating how MapReduce™ can be utilized in combination with Apache Hadoop™ in the distributed computing cluster depicted in FIG. 10.

FIG. 11 illustrates how MapReduce™ can be utilized in combination with Apache Hadoop™ in a distributed computing cluster 1002 to process various sources of information. MapReduce™ is a programming model for processing/generating big data sets with a parallel, distributed algorithm on a cluster. As shown in FIG. 11, MapReduce™ usually splits an input data set (e.g., content 602 comprising video clips) into independent chunks that are processed by the map tasks in a parallel manner. The framework sorts the outputs of the map tasks, which are then input to the reduce tasks. Ultimately, the output of the reduce tasks are one or more optimized parameter values that can be distributed as a parameter adjustment 612 by the analytics system 604 to one or more electronic devices 110, for example, via base station 105.

Figure 12:
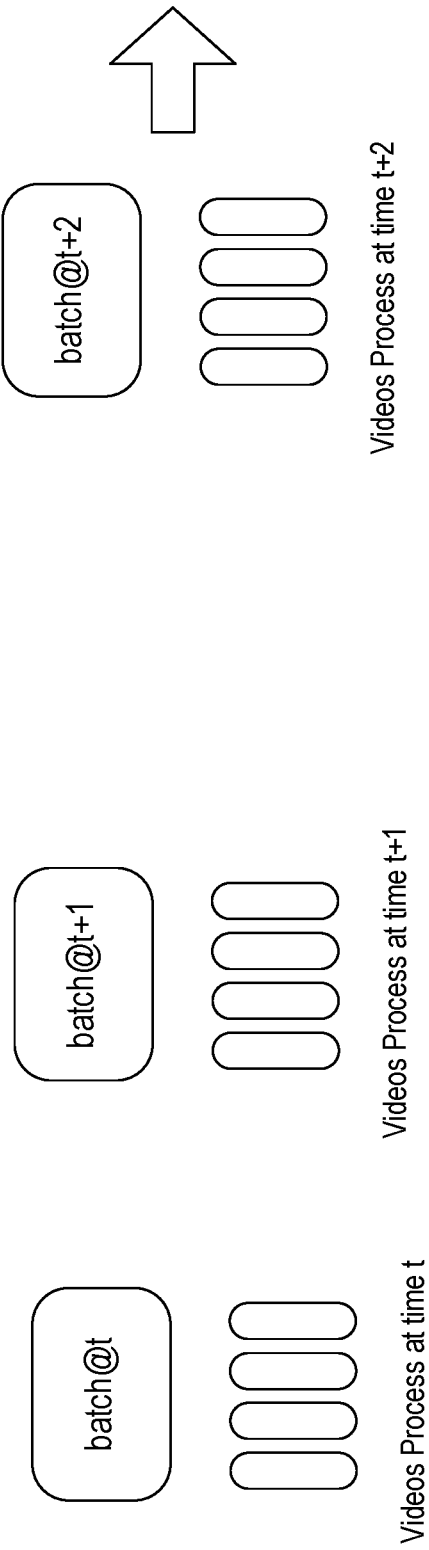
FIG. 12 is a diagram illustrating how content can be processed in batches.

FIG. 12 illustrates how content 602 can be processed in batches by the analytics system 604. Here, for example, video clips generated by security cameras may be processed in groups. In some embodiments, all of the video clips corresponding to a certain segment of surveilled environments (e.g., a particular group of homes) are collected on a periodic basis. For example, video clips may be collected every 15 minutes, 30 minutes, 60 minutes, 120 minutes, etc. Thereafter, each batch of video clips can be processed. After processing has been completed, the parameter adjustments 612 can be generated by the analytics system 604 and distributed to various network-connected security systems to configure or reconfigured certain electronic devices. Thus, the electronic devices associated with a given network-connected security system may be periodically configured instead of continually configured and reconfigured. Users may be permitted to manually specify the cadence at which electronic devices are configured based on parameter adjustments from the analytics system 604.

Figure 13:
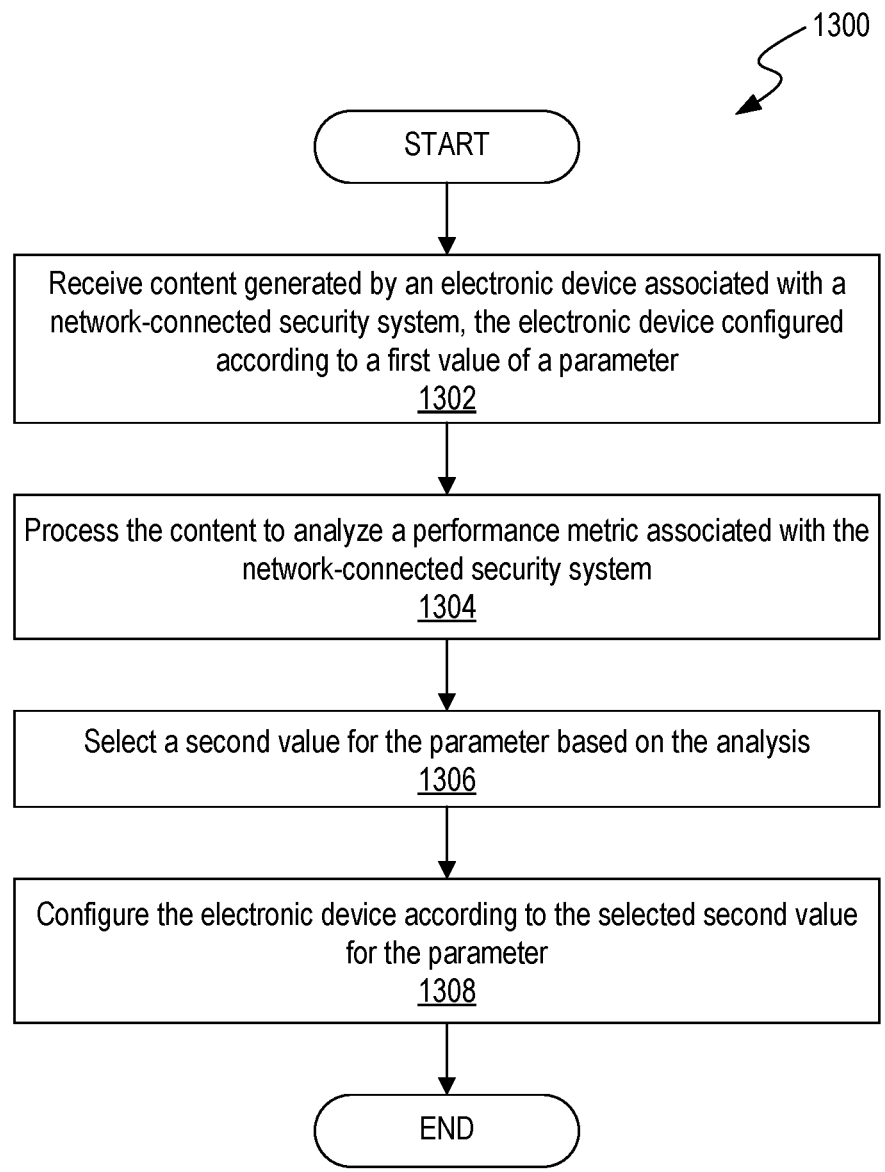
FIG. 13 is a flow diagram of an example process for presenting notifications at a client device based on analysis of content generated at electronic devices in a network-connected security system.

FIG. 13 shows a flow chart of an example process 1300 for adjusting electronic device parameters based on analysis of content, according to some embodiments. One or more steps of the example process 1300 may be performed by any one or more of the components of the example computer system 1400 described with respect to FIG. 14. For example, the example process 1300 depicted in FIG. 13 may be represented in instructions stored in memory that are then executed by a processing unit. The process 1300 described with respect to FIG. 13 is an example provided for illustrative purposes and is not to be construed as limiting. Other processes may include more or fewer steps than depicted while remaining within the scope of the present disclosure. Further, the steps depicted in example process 1300 may be performed in a different order than is shown.

Example process 1300 begins at step 1302 with receiving content 602 generated by an electronic device 110 configured according to a first value of a parameter. As previously discussed, the electronic device 110 may be one of several electronic devices 110 associated with a network-connected security system. In some embodiments, the content 602 is received at step 1302 via a computer network, from a base station 105 associated with the network-connected security system.

In some embodiments, the network-connected security system is a video surveillance system and the electronic device 110 is a network-connected video camera 110*a*. In such embodiments the content 602 may include video files. Further, the optical parameter may be any of an optical parameter, an image processing parameter, or an encoding parameter.

Example process 1300 continues at step 1304 with processing the content to analyze a performance metric associated with the network-connected security system and step 1306 with selecting a second value for the parameter associated with the electronic device 110 based on the analysis. The performance metric in this case may include a perceived quality of the content 602 generated by the network-connected security system, but may also include other types of performance metrics based, for example, on computing resource utilization, latency, security threat detection, etc.

In some embodiments, the step of processing the content to analyze the performance metric associated with the network-connected security system (step 1304) may include applying a content recognition process 610. The content recognition process 610 may include applying machine-learning, specifically deep learning using a neural network.

In some embodiments, the step of selecting a second value for the parameter (step 1306) may include applying a parameter optimization process 606 to select a second value that will increase the overall performance of the network-connected security system. Specifically, this step may include selecting a second value that will maximize the performance metric analyzed at step 1304 while taking into account one or more operational constraints associated with the network-connected security system such as content generation constraints, processing constraints, network bandwidth constraints, etc.

Depending on the computer system performing example process 1300, steps 1304 and 1306 may include transmitting the content 602 to another computing system for processing. For example, if a base station 105 is performing process 1300, steps 1304 and 306 may include transmitting, by the base station 105, the content 602, via an external network, to an external computing system such as a network-accessible server system 145 to process the content 602 to analyze the performance metric associated with the network-connected security system and to select the second value for the parameter based on the analysis.

Example process 1300 concludes at step 1308 with configuring (or causing another system to configure) the electronic device 110 according to the second value for the parameter selected at step 1306.

In some embodiments, configuring the electronic device 110 according to the second parameter may include generating a software module based on the selected second parameter and transmitting the software module (e.g., over a computer network) to a system to be utilized to configure the electronic device 110. For example, a computer system that selects the second value for the parameter and/or that generates the software module (e.g., network-accessible server system 145) may transmit the software module over an external network to a base station 105 associated with the network-connected security system. The base station 105 may then utilize the received software module to configure the electronic device 110 according to the selected second value, for example, by transmitting the software module over a local network to the electronic device 110 for installation at the electronic device 110.

In some embodiments, configuring the electronic device 110 according to the second parameter may include transmitting a message including the second value of the parameter to a system to be utilized to configure the electronic device 110. For example, a computer system that selects the second value for the parameter (e.g., network-accessible server system 145) may transmit a message including the selected second value for the parameter over an external network to a base station 105 associated with the network-connected security system. The base station 105 may then read the received message and configure the electronic device according to the second value for the parameter included in the received message.

The base station 105 may utilize the received message to configure the electronic device 110 in several different ways. In some embodiments, the base station 105 may simply forward the received message over a local network to the electronic device 110. In other embodiments, the base station 105 may generate a new message that is readable by the electronic device 110 and that includes the selected second value for the parameter. In both cases, the electronic device 110 may utilize messages received from the base station 105 to configure itself according to the selected second value of the parameter. In other some embodiments, the base station 105 may generate a software module (e.g., as described above) based on the received message and transmit the software module over a local network to the electronic device 110 for installation at the electronic device 110.

Although not indicated in FIG. 13, in some embodiments the example process 1100 may be continually repeated (e.g., at periodic intervals or in response to detected events). In such cases, example process 1300 may further include continuing to receive additional content generated by the electronic device 110, continually selecting updated values for the parameter based on the additional content as the additional content is received and processed, and periodically configuring the electronic device 110 according to the updated values as the updated values are selected.

Computer System

Figure 14:
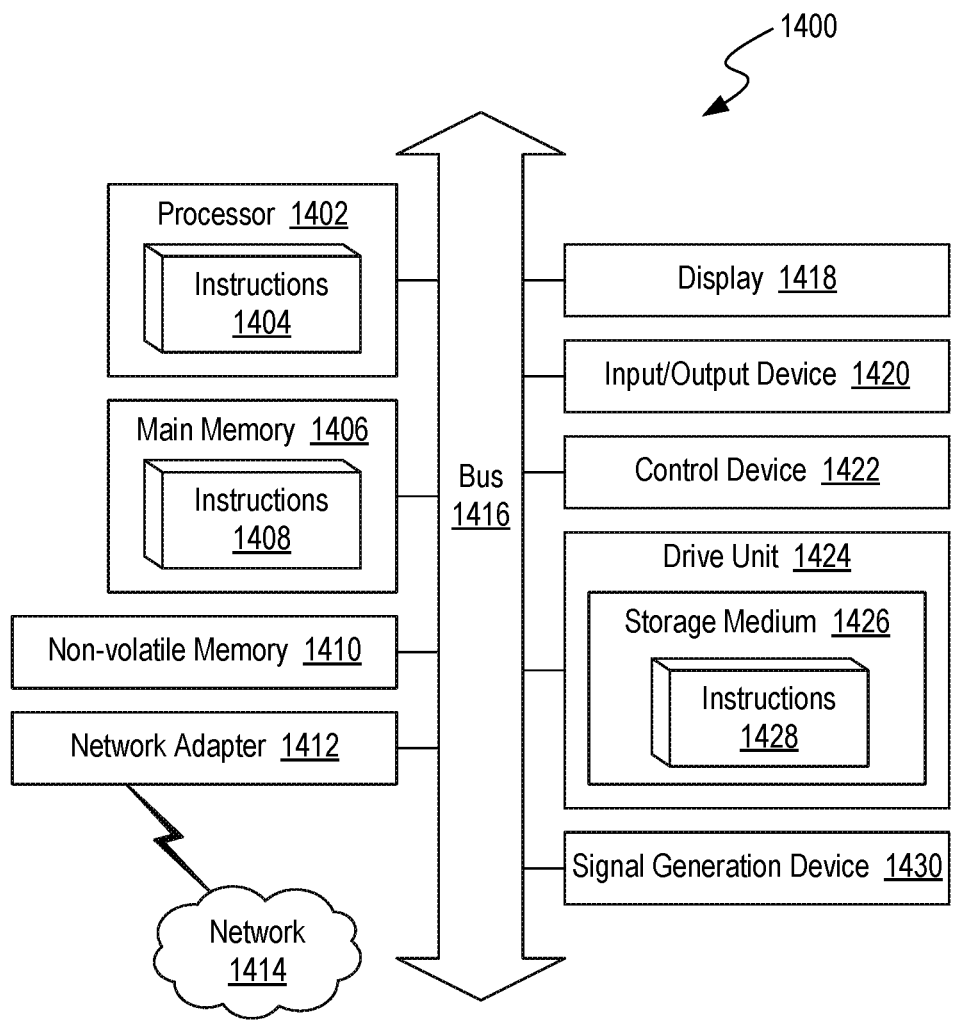
FIG. 14 is a diagram illustrating an example of a computer processing system in which at least some operations described herein can be implemented.

FIG. 14 is a block diagram illustrating an example of a computer system 1400 in which at least some operations described herein can be implemented. For example, some components of the computer system 1400 may be hosted any one or more of the devices described with respect to operating environment 100 in FIG. 1 such as electronic devices 110, base station 105, APs 120, local storage 115, network-accessible server system 145, and user devices 102.

The computer system 1400 may include one or more central processing units ("processors") 1402, main memory 1406, non-volatile memory 1410, network adapter 1412 (e.g., network interface), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 1400 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the computer system 1400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 1402, the instruction(s) cause the computer system 1400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1412 enables the computer system 1400 to mediate data in a network 1414 with an entity that is external to the computer system 1400 through any communication protocol supported by the computer system 1400 and the external entity. The network adapter 1412 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1412 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can b e in the form of one or more application-specific integrated circuits (ASICs), programmable logic devices (PLDs), field-programmable gate arrays (FPGAs), etc.

Figure 15:
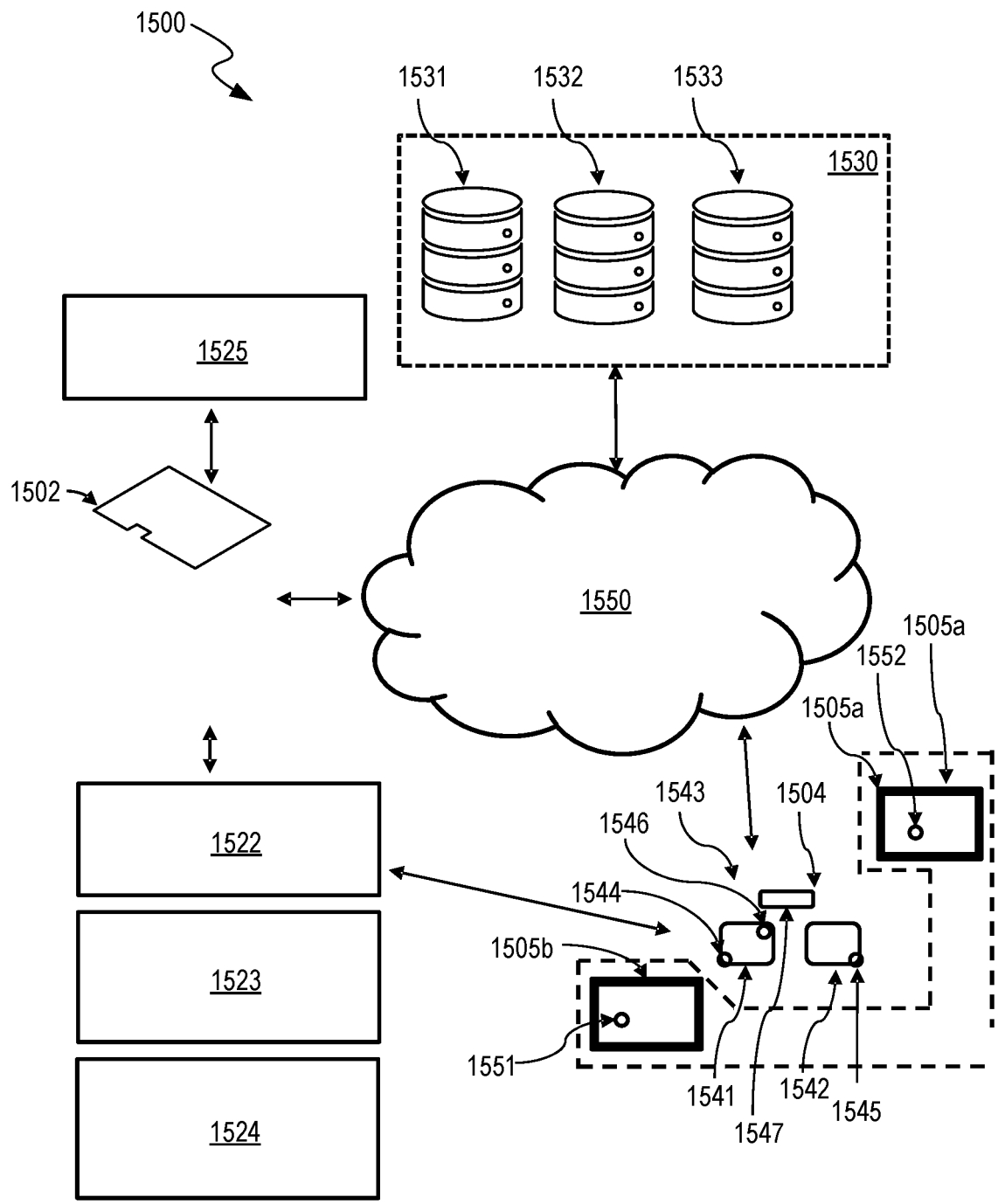
FIG. 15 illustrates an extended reality (XR) system, in accordance with one or more embodiments.

FIG. 15 illustrates an extended reality (XR) system 1500, in accordance with one or more embodiments. Extended reality is a catch-all term to refer to augmented reality, virtual reality, and mixed reality. The technology is intended to combine or mirror the physical world with a "digital twin world" that is able to interact with each other. System 1500 can be used to perform an XR computer-implemented method. For example, system 1500 can be used in conjunction with adjusting parameters in a network-connected security system based on content analysis, etc. System 5000 can be used to simulate monitoring of behavior, activities, or other changing information for the purpose of influencing, managing, or protecting people/items in a given environment, or train machine learning (ML) systems. An example ML system 1900 is illustrated and described in more detail with reference to FIG. 19.

System 1500 can analyze security system performance and then generate additional simulations based on the security system performance to simulate the processes described herein any number of times. System 1500 can remove, add, or modify actions based on, for example, security system performance, user input, predicted events, outcomes, or the like. System 1500 can generate an XR environment (e.g., an augmented reality (AR) environment or other environment) with displayed event information (e.g., mappings of intruders), instrument data (e.g., instrument instructions, operational parameters, etc.), sensor data, user data (e.g., real-time behavior), and other information for assisting the user.

System 1500 can include an AR device (e.g., wearable device 1504) that provides virtual reality (VR) simulations for monitoring of behavior, activities, or other changing information. VR is a simulated experience that employs pose tracking and 3D near-eye displays to give the user an immersive feel of a virtual world. In some embodiments, system 1500 generates an XR simulation environment that includes a digital environment model. The digital model is viewable by at least one user using an AR device, such as the devices illustrated and described in more detail with reference to FIGS. 15-16. The XR simulation environment is configured to enable the at least one user to virtually perform one or more steps on the digital model. For example, the user can identify behavior, activities, or other changing information when viewing a digital twin or a virtual model of the environment.

A different XR platform is used, and a different XR simulation environment is generated for different environment types, e.g., business, home, or airport. A different XR platform is used for each of the above because each platform has different modeling parameters. The modeling parameters can be retrieved from a modeling parameter library for generating a digital model.

Different ML models are used and trained differently for each XR simulation environment generated. For example, an ML model for an airport is trained using training data describing passenger activity, security personnel, baggage movement, airplane movement, etc. Different XR platforms are used because the error margins between features are different for different environment types. The granularity of features is different in different environments. Therefore, different VR modeling is performed for each environment type, and different software packages are designed.

VR training can also include identifying features (e.g., people or vehicles), equipment, vehicle positions, and other data to assist in monitoring of behavior, activities, or other changing information. User input (e.g., labels, position notes, or the like) can be collected (e.g., voice, keyboard, XR device input, etc.) during the simulations and then used to modify planned procedures, provide annotation during procedures using XR environments, or the like.

In some embodiments, system 1500 receives feature mapping information from the at least one user via the XR device (e.g., VR device, AR device, etc.). In some embodiments, the same XR device is used to perform VR simulations to input mapping information and perform AR-assisted monitoring on the environment based on the mapping information. In other embodiments, different XR devices are used for training and performing the monitoring of behavior, activities, or other changing information. In some training procedures, multiple users input mapping information, which is aggregated to determine what information is correct. The aggregation can b e used to determine confidence scoring for XR mapping. For example, a confidence score for AR mapping is based on a threshold percentage (e.g., at least 80%, 90%, 95%, or 99%) of the users providing the same mapping (e.g., mapping input using an XR environment).

In response to the confidence score reaching a threshold level for features associated with an environment, the mapping can be deployed for performing monitoring of behavior, activities, or other changing information. In AR/VR-assisted monitoring, wearable device 1504 can display information to assist the user. The displayed information can include environmental information (e.g., instrument information, movement in a vicinity, or potential adverse events), and other information to assist the user. The user can move, add, or eliminate displayed information to enhance the experience. The configuration of the wearable device 1504, information displayed, and feedback provided to the user can be selected based on procedures to be performed.

In some embodiments, system 1500 performs confidence-score AR mapping to meet a confidence threshold for an environment. The confidence-score AR mapping includes selecting at least a portion of the mapping information for the AR mapping to the environment. The selected mapping information is mapped to the environmental features. Via the AR device, an AR environment is displayed to the at least one user. The AR environment includes the mapping of the selected mapping information to the features.

In some embodiments, the confidence threshold (e.g., 90%, 95%, or 99%) is selected based on an environmental type. Image/video data of the environment is segmented to identify digital features associated with the environment. For example, identification is performed using the ML system 1900 of FIG. 19. The digital features are part of the digital environment model. Via a VR device, one or more identification prompts are generated for receiving the environmental mapping information from the at least one user to label one or more discrete features viewed by the user. The discrete features associated with the environment can be identified using one or more ML algorithms.

The AR environment includes the mapping of the selected environmental mapping information to the environmental features. In some embodiments, the computer system maps at least some of the features of the environment using an ML platform. The ML platform includes a plurality of environment-type-specific ML modules to be applied to the image/video data of the environment to provide the environmental mapping. The environment-type-specific ML modules can be trained using environment-type grouped data sets, including environment-type mappings. Environment-type mappings can include layers based on the environment type. For example, an airport mapping can include layers showing features such as people, baggage, and vehicles. A home mapping can include layers showing landscaping, patios, walls, etc. The user can select layers, data sets, and mapping information to be added or removed from the environment-type data. For example, each platform includes a different feature extraction module, a different ML model, and different training methods.

System 1500 includes a server (or other computer system 1502), where such system 1502 includes one or more non-transitory storage media storing program instructions to perform one or more operations of a projection module 1522, a display module 1523, or a feedback module 1524. In some embodiments, system 1500 includes wearable device 1504, where the wearable device 1504 may include one or more non-transitory storage media storing program instructions to perform one or more operations of the projection module 1522, the display module 1523, or the feedback module 1524.

Wearable device 1504 can be a VR headset, such as a head-mounted device that provides VR for the wearer. Wearable device 1504 can be used in applications, including simulators and trainers for monitoring of behavior, activities, or other changing information. Wearable device 1504 typically includes a stereoscopic display (providing separate images for each eye), stereo sound, and sensors like accelerometers and gyroscopes for tracking the pose of the user's head to match the orientation of the virtual camera with the user's eye positions in the real world. The user can be a security professional. Wearable device 1504 can also have eye-tracking sensors and controllers. Wearable device 1504 can use head-tracking, which changes the field of vision as a user turns their head.

Wearable device 1504 can include imagers, sensors, displays, feedback devices, controllers, or the like. The wearable device 1504 can capture data, locally analyze data, and provide output to the user based on the data. A controller of the wearable device 1504 can perform local computing (e.g., edge computing) with or without communicating with a remote server and can store edge computing ML libraries locally analyzing data to provide output. This allows onboard processing to be performed to avoid or limit the impact of, for example, network communications. Edge computing is a distributed computing paradigm that brings computation and data storage closer to the sources of data. This improves response times and saves bandwidth. Edge computing is an emerging computing paradigm which refers to a range of networks and devices at or near the user. Edge computing processes video data closer to the electronic devices, enabling processing at greater speeds and volumes, leading to greater action-led results in real time.

System 1500 can include one or more wearable devices configured to be worn on other parts of the body. The wearable devices can include, for example, gloves (e.g., haptic feedback gloves or motion-tracking gloves), wearable glasses, loops, heart monitors, heart rate monitors, or the like. These wearable devices can communicate with components of the system 1500 via wire connections, optical connections, wireless communications, etc. The wearable device 1504 can also communicate with external sensors and equipment. The wearable device 1504 can receive data (sensor output, equipment output, operational information for instruments, etc.) and display the received information to the user. This allows the user to view sensor data without turning their attention away from a monitoring site.

System 1500 can include a set of external displays 1505 (e.g., accessories of the wearable device 1504, desktop monitors, television screens, or other external displays), where the set of external displays 1505 may be provided instructions to display visual stimuli based on measurements or instructions provided by the wearable device 1504 or the server 1502. In some embodiments, the wearable device 1504 may communicate with various other electronic devices via a network 1550, where the network 1550 may include the Internet, a local area network, a peer-to-peer network, etc.

The wearable device 1504 may send and receive messages through the network 1550 to communicate with a server 1502, where the server 1502 may include one or more non-transitory storage media storing program instructions to perform one or more operations of a statistical predictor 1525. It should further be noted that while one or more operations are described herein as being performed by particular components of the system 1500, those operations may be performed by other components of the system 1500 in some embodiments. For example, operations described in this disclosure as being performed by the server 1502 may instead be performed by the wearable device 1504, where program code or data stored on the server 1502 may be stored on the wearable device 1504 or another client computer device instead. Similarly, in some embodiments, the server 1502 may store program code or perform operations described as being performed by the wearable device 1504. For example, the server may perform operations described as being performed by the projection module 1522, the display module 1523, or the feedback module 1524. Furthermore, although some embodiments are described herein with respect to ML models, other prediction models (e.g., a statistical model) may be used instead of or in addition to ML models. For example, a statistical model may be used to replace a neural network model in one or more embodiments. An example ML system 1900 is illustrated and described in more detail with reference to FIG. 19.

In some embodiments, the system 1500 may present a set of stimuli (e.g., shapes, text, or images) on a display of the wearable device 1504. The wearable device 1504 may include a case 1543, a left transparent display 1541, and a right transparent display 1542, where light may be projected from emitters of the wearable device through waveguides of the transparent displays 1541-1542 to present stimuli viewable by an eye(s) of a user wearing the wearable device 1504. The wearable device 1504 also includes a set of outward-facing sensors 1547, where the set of outward-facing sensors 1547 may provide sensor data indicating the physical space around the wearable device 1504. In some embodiments, the set of outward-facing sensors 1547 may include cameras, infrared sensors, lidar sensors, radar sensors, etc. In some embodiments, the sensors 1547 can be inward-facing to monitor the user's state (e.g., level of stress, alertness level, etc.).

In some embodiments, the sensors 1547 can be cameras that capture images of the environment, people, equipment, user, or the like. The captured images can be used to analyze steps being performed, the environment state, and/or the surrounding environment. This allows the system 1500 to provide comprehensive analytics during procedures. For example, output from the sensors 1547 of the wearable device 1504 can be used to analyze the concentration/focus level of the user, alertness of the user, and stress level of the user (e.g., stress level calculated based on user metrics, such as heart rate, blood pressure, or breathing pattern), and other metrics. In some embodiments, if the user becomes unable to maintain a threshold level of focus, the system 1500 can modify the processes described herein such that critical steps are performed by another user, a robotic system, or using alternative techniques.

In some embodiments, sensors 1547 can track the wearer's eyes and provide feedback to the user to encourage the user to focus on targeted regions for visualization. This can help train the user to focus attention on regions or areas for actions or monitoring of behavior, activities, or other changing information. The wearable device 1504 can receive and store plans, data, and other information sufficient to allow one or more security steps to be performed with or without remote communications. This ensures that security steps can be completed if there is communication failure at the environment.

In some procedures, the system 1500 can develop one or more training simulations for a user. The user can perform the simulations for manual procedures, robotically assisted procedures, or robotic procedures. The system 1500 can adaptively update the simulations based on desired procedure criteria, such as process time, predicted outcome, safety, outcome scores, or the like. This allows the system 1500 to develop security plans suitable for the security procedures while training the user. In some embodiments, the wearable device 1504 can collect user input to synchronize the user's input with a security procedure. For example, the system 1500 can develop security plans with security steps for appropriate time periods based on threshold metrics. If the user becomes fatigued or tired, security steps can be shortened, reduced, or assigned to other users. Other users can use other wearable devices that are synchronized to communicate with the wearable device 1504 to provide coordinated operation between users.

In some embodiments, system 1500 receives an environment type. A digital environmental model is generated based on the environment type. The digital environmental model includes environmental information associated with a portion of the environmental features. For example, system 1500 retrieves modeling parameters for generating the digital environmental model based on one or more security steps. The digital environmental model is generated according to the modeling parameters. The modeling parameters can include, for example, one or more parametric modeling parameters, model properties (e.g., thermal properties), fluid modeling parameters, mesh parameters (e.g., parameters for generating 3D meshes), kinematic parameters, boundary conditions, loading parameters, biomechanical parameters, fluid dynamic parameters, thermodynamic parameters, etc. The environmental features are identified within the digital environmental model. Environmental characteristics are assigned to the identified environmental features for viewing by the at least one user. The environmental characteristics can include, for example, one or more environmental feature statuses (e.g., crowded, sparse, high traffic), area properties, sizes of environmental features, etc.

In some embodiments, system 1500 retrieves modeling parameters for generating the environmental model based on one or more security steps. The digital model is generated according to the modeling parameters. The environmental features are identified within the digital model. Environmental characteristics are assigned to the identified environmental features for viewing by the at least one user. For example, the modeling parameters define three-dimensional (3D) objects in an XR or AR environment that can be moved with a number of degrees of freedom (e.g., six degrees of freedom) using a controller (e.g., cursor). Modeling the identified features enables a user to experiment with perspective compared to traditional software.

The XR simulation environment can include polygonal modeling, e.g., connecting points in 3D space (vertices) by line segments to form a polygonal mesh. For example, the XR simulation environment includes textured polygonal meshes that are flexible and/or planar to approximate curved surfaces. In some embodiments, curve modeling (defining surfaces by curves that are influenced by weighted control points) is used. For example, performing security steps virtually on the digital model uses digital sculpting (also known as sculpt modeling or 3D sculpting) to cut, push, pull, smooth, grab, pinch or otherwise manipulate virtual features.

Generating the digital model is performed by developing a mathematical coordinate-based representation of different surfaces of the features in three dimensions by manipulating edges, vertices, and polygons in the simulated XR environment. The digital model represents the physical environment using a collection of points in 3D space, connected by different geometric entities such as lines and curved surfaces, etc. In embodiments, the digital model can be created by procedural modeling or scanning based on imaging methods. The digital model can also b e represented as a 2D image using 3D rendering.

The AR mapping to the environment can include solid models that define a volume of the environmental feature they represent, mapped using constructive solid geometry. One or more correlations are determined between the environmental mapping information and at least one security state, e.g., at an oil and gas facility. A confidence-score AR mapping engine is updated based on the determination. The confidence-score AR mapping engine is configured to perform confidence-score AR mapping for other scenarios in new AR environments.

The environmental mapping information can include shells or boundaries that represent surfaces of the environmental features. The AR environment displayed to the at least one user can include polygonal meshes representing the physical features, subdivision surfaces, or level sets for deforming surfaces that can undergo topological changes. The AR mapping process can include transforming digital representations of the features into polygonal representations (polygon-based rendering) of the features overlaid on images of the physical features.

Furthermore, the system 1500 may present stimuli on the set of external displays 1505 during a visual testing operation. While the set of external displays 1505 is shown with two external displays, a set of external displays may include more or fewer external displays, such as only one external display or more than two external displays. For example, a set of external displays may include four external displays, eight external displays, nine external displays, or some other number of external displays. The external displays may include one or more types of electronic displays, such as computer monitors, smartphones, television screens, laptop devices, tablet devices, LED devices, LCD devices, and other types of electronic displays, etc. In some embodiments, the external display may include a projector, where the location of the external display may include a wall or screen onto which one or more stimuli is projected. In some embodiments, the external display may itself be transparent or partially transparent.

During or after a visual testing operation, the system 1500 may obtain feedback information related to the set of stimuli, where the feedback information may indicate whether or how an eye responds to one or more stimuli of the set of stimuli. For example, some embodiments may use the wearable device 1504 to collect feedback information that includes various eye-related characteristics. In some embodiments, the feedback information may include an indication of a response of an eye to the presentation of a dynamic stimulus at a first display location 1546 on a wearable device 1504. Alternatively, or in addition, the feedback information may include an indication of a lack of a response to such a stimulus. The response or lack of response may be determined based on one or more eye-related characteristics, such as an eye movement, a gaze direction, a distance in which an eye's gaze traveled in the gaze direction, a pupil size change, a user-specific input, etc. In some embodiments, the feedback information may include image data or results based on image data. For example, some embodiments may obtain an image or sequence of images (e.g., in the form of a video) of an eye captured during a testing operation as the eye responds to a stimulus.

In some embodiments, the system 1500 may track the ocular data of an eye and update associated ocular information based on feedback information indicating eye responses to stimuli. Some embodiments may use a prediction model to detect a non-responsive region of a visual field or another ocular issue of a visual field portion associated with the ocular data. In some embodiments, satisfying a set of vision criteria for a visual field location may include determining whether an eye responded to a stimulus presented at the display location mapped to the visual field location, where different presented stimuli may vary in brightness, color, shape, size, etc.

In some embodiments, the system 1500 can adjust viewing by the user based on the ocular information collected by the wearable device 1504. Any number of simulations can be performed to generate ocular information suitable for determining optimal settings for a user. The settings can change throughout a security procedure based on security steps. For example, if the user becomes tired or fatigued, the system 1500 can adjust the visual field to stimulate the user, thereby increasing attentiveness, e.g., in a war zone or combat scenario. In some embodiments, the user can adjust the stimuli to his or her preferred preferences. Other responses can be collected and associated with the security procedure, specific security steps, or the like. Feedback scores can be generated to rank the collected set of stimuli. The score can be based on the time to complete action, biometric levels of the user (e.g., state of stress or heart rate), or other metrics.

In some embodiments, data used or updated by one or more operations described in this disclosure may be stored in a set of databases 1530. In some embodiments, the server 1502, the wearable device 1504, the set of external displays 1505, or other computer devices may access the set of databases to perform one or more operations described in this disclosure. For example, a prediction model used to determine ocular information may be obtained from a first database 1531, where the first database 1531 may be used to store prediction models or parameters of prediction models. Alternatively, or in addition, the set of databases 1530 may store feedback information collected by the wearable device 1504 or results determined from the feedback information. For example, a second database 1532 may be used to store a set of user profiles that include or link to feedback information corresponding with eye measurement data for the users identified by the set of user profiles. Alternatively, or in addition, the set of databases 1530 may store instructions indicating different types of testing procedures. For example, a third database 1533 may store a set of testing instructions that causes a first stimulus to be presented on the wearable device 1504, then causes a second stimulus to be presented on a first external display 1505a, and thereafter causes a third stimulus to be presented on a second external display 1505b.

In some embodiments, the projection module 1522 may generate a field-to-display map that maps a position or region of a visual field with a position or region of the set of external displays 1505 or of an AR interface displayed on the left transparent display 1541 or the right transparent display 1542. The field-to-display map may be stored in various forms, such as in the form of a set of multi-dimensional arrays, a function, a subroutine, etc. For example, the field-to-display map may include a first multi-dimensional array, where the first two dimensions of the first array may indicate a coordinate in a combined display space that maps 1:1 with a visual field. In some embodiments, a third dimension of the first array may identify which external display or wearable display to use when presenting a stimulus. Furthermore, a fourth and fifth dimension of the array may be used as coordinates relative to the origin of each respective external display. In some embodiments, an array or other set of numbers described in this disclosure may instead be divided into a plurality of arrays or other subsets of numbers. In some embodiments, the field-to-display map may be used in reverse, such that a display location may be mapped to a visual field location ("field location") using the field-to-display map. Some embodiments pre-generate a display-to-field map by inverting one or more of the arrays described above. Furthermore, some embodiments may use or update a map by using an array or other data structure of the map. Various other embodiments of the field-to-display map are possible, as described elsewhere in this disclosure.

In some embodiments, the projection module 1522 may obtain sensor information from the set of outward-facing sensors 1547, where the sensor information may include position measurements of the set of external displays 1505. For example, a user wearing the wearable device 1504 may rotate or translate their head, which may cause a corresponding rotation or translation of the wearable device 1504. Some embodiments may detect these changes in the physical orientation or position of the wearable device 1504 with respect to the set of external displays 1505. Some embodiments may then perform a mapping operation to determine the positions and orientations of the set of external displays based on the sensor information collected by the set of outward-facing sensors 1547.

In some embodiments, the projection module 1522 may update a field-to-display map that stores or otherwise indicates associations between field locations of a visual field and display locations of the left transparent display 1541, the right transparent display 1542, or the set of external displays 1505. For example, the set of outward-facing sensors 1547 may include one or more cameras to collect visual information from a surrounding area of the wearable device 1504, where the visual information may be used to determine a position or orientation of one or more devices of the set of external displays 1505. As the wearable device 1504 is moved, some embodiments may continuously obtain sensor information indicating changes to the external environment, including changes in the position or orientation of the set of external displays 1505 relative to the position or orientation of the wearable device 1504. For example, some embodiments may generate a point cloud representing the surfaces of objects around the wearable device 1504 and determine the positions and orientations of the set of external displays 1505 relative to the wearable device 1504 based on the point cloud. Furthermore, some embodiments may continuously update the field-to-display map as new sensor information is collected by the set of outward-facing sensors 1547.

In some embodiments, the display module 1523 may present a set of stimuli on the wearable device 1504 or the set of external displays 1505. In some embodiments, the left transparent display 1541 and right transparent display 1542 may be positioned with respect to the case 1543 to fit an orbital area on a user such that each display of the transparent displays 1541-1542 is able to collect data and present stimuli or other images to the user. The left transparent display 1541 and right transparent display 1542 may contain or be associated with an electronic display configured to present re-created images to an eye viewing the respective transparent display. In various embodiments, electronic display may include a projector, display screen, and/or hardware to present an image viewable by the eye. In some embodiments, a projector of an electronic monitor may be positioned to project images onto an eye of the subject or onto or through a screen, glass, waveguide, or other material. For example, the display module 1523 may cause a fixation point or another visual stimulus to be projected onto the first display location 1546, where the fixation point at the first display location 1546 may then be viewed by an eye of a user wearing the wearable device 1504.

In some embodiments, the display module 1523 may cause a set of stimuli to be displayed onto electronic displays other than the displays of the other external displays, such as an external display of the set of the external displays 1505. For example, after presenting a stimulus on a display of the wearable device 1504, the display module 1523 may cause a stimulus to be presented on the second external display 1505*b* at a second display location 1551. As used in this disclosure, an external display location may include a display location on an external display. The display module 1523 may then proceed to display additional stimuli on an additional location of the first external display 1505*a*, the wearable device 1504, or the second external display 1505*b*.

Some embodiments may determine the display location for a stimulus by first determining the location or region of a visual field. After determining the location or region of the visual field, some embodiments may then use a field-to-display map to determine which display location of the left transparent display 1541, the right transparent display 1542, or the set of external displays 1505 to use when displaying a stimulus. For example, some embodiments may determine that a previous sequence of sensor measurements indicated that a first region of a visual field has not yet been tested and select this first region for testing. Some embodiments may then use the field-to-display map to determine a third display location 1552 on the first external display 1505*a* and, in response to selecting the third display location 1552, display a stimulus at the third display location 1552. As described elsewhere in this disclosure, some embodiments may measure eye movements or otherwise measure responses of an eye to the stimuli presented on the set of external displays 1505 to measure a visual field of the eye. Furthermore, as described in this disclosure, a visual field location of a stimulus may include the field location mapped to or otherwise associated with the display location of the stimulus, where the mapping or association between the display and the field location is determined by a field-to-display map. Similarly, as used in this disclosure, a gaze location that is located at a field location may also be described as being located at a display location mapped to the field location.

In some embodiments, the feedback module 1524 may record feedback information indicating eye responses to the set of stimuli presented on the wearable device 1504 or the set of external displays 1505. In some embodiments, the transparent displays 1541-1542 may include a left inward-directed sensor 1544 and a right inward-directed sensor 1545, where the inward-directed sensors 1544-1545 may include eye-tracking sensors. The inward-directed sensors 1544-1545 may include cameras, infrared cameras, photodetectors, infrared sensors, etc. For example, the inward-directed sensors 1544-1545 may include cameras configured to track pupil movement and determine and track the visual axes of the subject. In some embodiments, the inward-directed sensors 1544-1545 may include infrared cameras and be positioned in lower portions relative to the transparent displays 1541-1542. The inward-directed sensors 1544-1545 may be directionally aligned to point toward a presumed pupil region for line-of-sight tracking or pupil tracking.

In some embodiments, the feedback module 1524 may use the inward-directed sensors 1544-1545 to collect feedback information indicating eye motion as an eye responds to different stimuli. For example, the feedback module 1524 may retrieve feedback information of an eye collected by the inward-directed sensors 1544-1545 as the eye responds to the presentation of a stimulus at the first display location 1546 and the second display location 1551. By collecting feedback information while stimuli are presented on both the wearable device 1504 and one or more devices of the set of external displays 1505, some embodiments may increase the boundaries of a visual field for which ocular data may be detected.

In some embodiments, the statistical predictor 1525 may retrieve stimuli information, such as stimuli locations and characteristics of the stimuli locations, where the stimuli locations may include locations on the set of external displays 1505. The statistical predictor 1525 may also retrieve training outputs indicative of the presence or absence of ocular responses or other outputs of a prediction model. The statistical predictor 1525 may then provide the set of stimuli information and training outputs to a ML model to update the parameters of the ML model to predict ocular responses based on new inputs. An example ML system 1900 is illustrated and described in more detail with reference to FIG. 19. Alternatively, or in addition, the statistical predictor 1525 may use statistical models or rules to determine ocular responses and generate a visual field map representing a visual field of an eye, where one or more regions of the visual field map may be associated with a set of ocular responses or otherwise include ocular response information.

Figure 16:
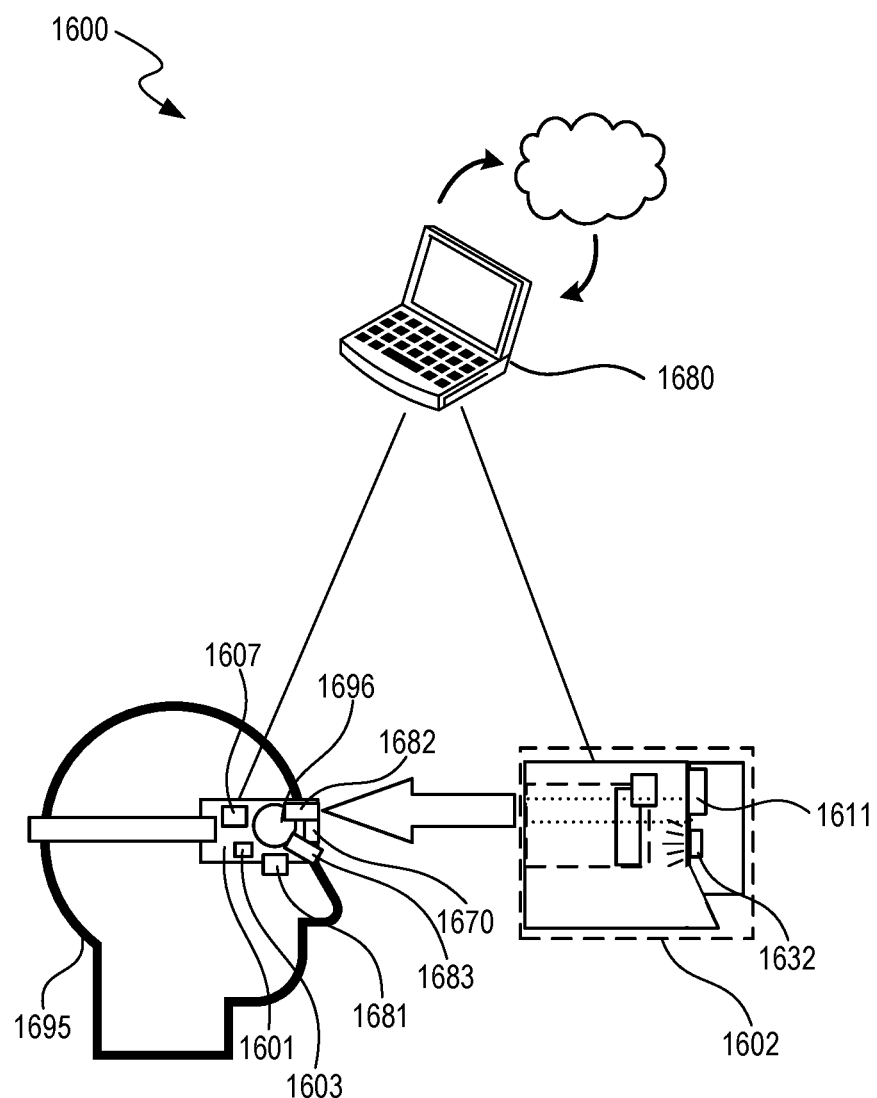
FIG. 16 illustrates an XR head mounted display (HMD), in accordance with one or more embodiments.

FIG. 16 illustrates an XR head mounted display (HMD) 1601, in accordance with one or more embodiments. HMD 1601 can be, for example, an augmented reality (AR) device worn by a user while the user views a security environment. Augmented reality is an interactive experience that combines the real world and computer-generated content. The content can span multiple sensory modalities, including visual, auditory, haptic, somatosensory and olfactory. Information can be displayed at selected locations to avoid obstructing the viewing of targeted areas. Security professional 1695 can wear HMD 1601, which can include a computing device 1607. Computing device 1607 can include a processor, microprocessor, controller, or other circuitry. In some embodiments, an eye 1696 of the security professional may be capable of viewing images and video in XR from the environment 1602 through lenses 1670 of the HMD 1601. The HMD 1601 may include an interior-facing camera to capture eye-related information and a set of exterior-facing cameras that include an exterior-facing camera 1682.

In some embodiments, a user initiates an XR session using computing system 1680 that is in communication with the HMD 1601. Computing system 1680 may include a stand-alone computer capable of operating without connecting to another computing device outside of a local network. Alternatively, or in addition, the computing system 1680 may include a computing system that receives program instructions or required data from an external data source not available through a local network.

In some embodiments, the computing system 1680 may initiate an XR session. Computing system 1680 may communicate with the HMD 1601 via a wireless connection or wired connection. For example, the computing system 1680 may send a wireless message to the computing device 1607 to initiate an XR session. For example, the computing system 1680 may send a command to the HMD 1601 via a Bluetooth® connection, where the command may cause the HMD 1601 to activate.

In some embodiments, the computing system 1680 may communicate with both the HMD 1601 to perform one or more operations. For example, the HMD 1601 may present an initial set of instructions to a security professional 1695 and request a response from the security professional 1695. After the security professional 1695 provides a requested response (e.g., pressing a button, making a statement, etc.), the computing system 1680 may send a first set of instructions to the HMD 1601 to calibrate readings to more accurately measure eye-related data associated with the eye 1696. After the HMD 1601 sends a message to the computing system 1680 that calibration operations have been completed, the computing system 1680 may send further instructions to the HMD 1601. The computing system 1680 may determine the position of a fixation point based on eye-related readings and send a message to the HMD 1601 that causes the HMD 1601 to display a visual stimulus at the fixation point on the lenses 1670. After receiving a message from the HMD 1101 that the eye 1696 has set its gaze at the fixation point, the computing system 1680 may continue the XR session.

In some embodiments, an application executed by the computing device 1607 of the HMD 1601 may be used to control operations of components of the HMD 1601 or other electronic components. For example, the application executed by computing device 1607 may begin a visual test program and send a wireless message to a circuitry of the system 1680 using a wireless headset communication subsystem 1603. The wireless message may be based on one of various types of communication standards, such as a Bluetooth® standard, a Wi-Fi Direct standard, a NFC standard, a ZigBee® standard, a 6LoWPAN standard, etc.

In some embodiments, an application being executed by the computing device 1607 may retrieve data from the interior-facing camera 1683 and send instructions to control security equipment based on this data. For example, the computing device 1607 may execute an application to perform a Viola-Jones object detection framework to detect an eye in a set of images using a boosted feature classifier based on video data provided by the interior-facing camera 1683. Furthermore, the application executed by the computing device 1607 may permit additional sensor data to trigger equipment in the operating room 1602, such as by receiving voice instructions captured from a microphone 1681, motion detected by the exterior-facing camera 1682, feeling a set of touches on the body of the HMD 1601, etc.

In some embodiments, a testing application executed by the computing device 1607 detects that a gaze location of security professional 1695 is focused on a target user interface (UI) element or a target direction based on data collected by interior-facing camera 1683. For example, HMD 1601 displays a set of instructions that causes security professional 1695 to look at a target UI location. In some embodiments, the target UI location is represented by a target region associated with the target UI location, such that a gaze location determined to be within the target region is considered to be focused on the target UI location. In response to a determination that the gaze location of eye 1696 is focused on the target UI location based on images provided by the interior-facing camera 1683, the application can activate security equipment 1632. Furthermore, the application can send a message to robotic security system 1611 to turn off security equipment 1632 based on a determination that the target UI location is no longer a focus of the user's gaze. Alternatively, some embodiments may forego waiting for the security professional 1695 to focus on a particular UI location or a particular direction before activating the security equipment 1632.

Figure 17:
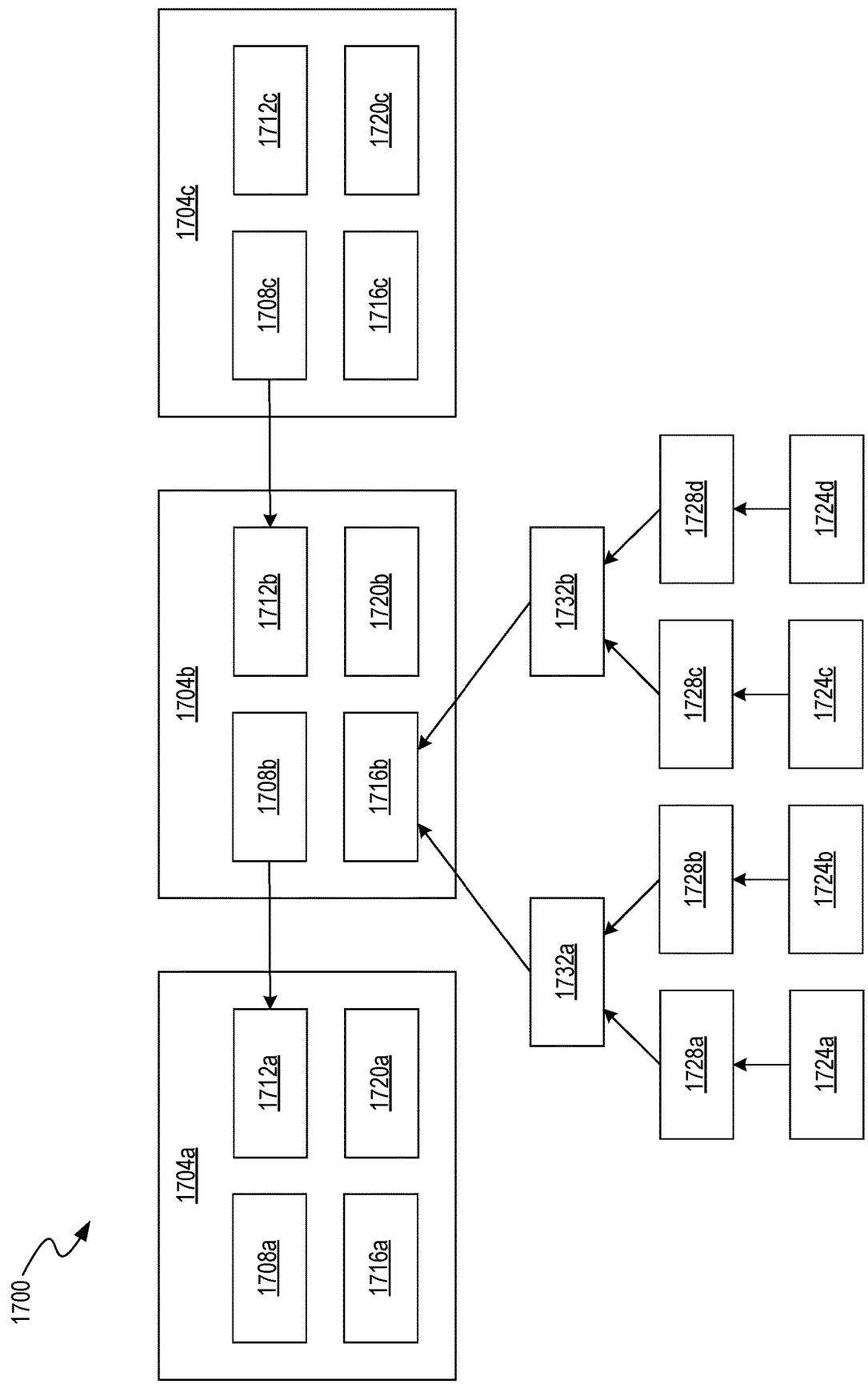
FIG. 17 is a block diagram illustrating components of at least a portion of an exemplary blockchain system, in accordance with one or more embodiments of this disclosure.

FIG. 17 is a block diagram illustrating components of at least a portion of an exemplary blockchain system 1700, in accordance with one or more embodiments of this disclosure. Blockchain system 1700 includes blockchain 1704. In embodiments, the blockchain 1704 is a distributed ledger of transactions (e.g., a continuously growing list of records, such as records of transactions for digital assets such as cryptocurrency, bitcoin, or electronic cash) that is maintained by a blockchain system 1700. For example, the blockchain 1704 is stored redundantly at multiple nodes (e.g., computers) of a blockchain network. Each node in the blockchain network can store a complete replica of the entirety of blockchain 1704. In some embodiments, the blockchain system 1700 implements storage of an identical blockchain at each node, even when nodes receive transactions in different orderings. The blockchain 1704 shown by FIG. 17 includes blocks such as block 1704a, block 1704b, and/or block 1704c. Likewise, embodiments of the blockchain system 1700 can include different and/or additional components or be connected in different ways.

The terms "blockchain" and "chain" are used interchangeably herein. In embodiments, the blockchain 1704 is a distributed database that is shared among the nodes of a computer network. As a database, the blockchain 1704 stores information electronically in a digital format. The blockchain 1704 can maintain a secure and decentralized record of transactions (e.g., transactions such as transaction 1724a and/or transaction 1724b). For example, the ERC-721 or ERC-1155 standards are used for maintaining a secure and decentralized record of transactions. The blockchain 1704 provides fidelity and security for the data record. In embodiments, blockchain 1704 collects information together in groups, known as "blocks" (e.g., blocks such as block 1704a, block 1704b, and/or block 1704c) that hold sets of information.

The blockchain 1704 structures its data into chunks (blocks) (e.g., blocks such as block 1704a, block 1704b, and/or block 1704c) that are strung together. Blocks (e.g., block 1704c) have certain storage capacities and, when filled, are closed and linked to a previously filled block (e.g., block 1704*b*), forming a chain of data known as the "blockchain." New information that follows a freshly added block (e.g., block 1704*b*) is compiled into a newly formed block (e.g., block 1704*c*) that will then also be added to the blockchain 1704 once filled. The data structure inherently makes an irreversible timeline of data when implemented in a decentralized nature. When a block is filled, it becomes a part of this timeline of blocks. Each block (e.g., block 1704*a*) in the blockchain system 1700 is given an exact timestamp (e.g., timestamp 1712*a*) when it is added to the blockchain system 1700. In the example of FIG. 17, blockchain system 1700 includes multiple blocks. Each of the blocks (e.g., block 1704*a*, block 1704*b*, block 1704*c*) can represent one or multiple transactions and can include a cryptographic hash of the previous block (e.g., previous hashes 1708*a-c*), a timestamp (e.g., timestamps 1712*a-c*), a transactions root hash (e.g., 1716*a-c*), and a nonce (e.g., 1720*a-c*). A transactions root hash (e.g., transactions root hash 1716*b*) indicates the proof that the block 1704*b* contains all the transactions in the proper order. Transactions root hash 1716*b* proves the integrity of transactions in the block 1704*b* without presenting all transactions.

In embodiments, the timestamp 1712*a-c* of each of corresponding blocks of block 1704*a*, block 1704*b*, block 1704*c* includes data indicating a time associated with the block. In some examples, the timestamp includes a sequence of characters that uniquely identifies a given point in time. In one example, the timestamp of a block includes the previous timestamp in its hash and enables the sequence of block generation to be verified.

In embodiments, nonces 1720*a-c* of each of corresponding blocks of block 1704*a*, block 1704*b*, block 1704*c* include any generated random or semi-random number. The nonce can be used by miners during proof of work (PoW), which refers to a form of adding new blocks of transactions to blockchain 1704. The work refers to generating a hash that matches the target hash for the current block. For example, a nonce is an arbitrary number that miners (e.g., devices that validate blocks) can change in order to modify a header hash and produce a hash that is less than or equal to the target hash value set by the network.

As described above, each of blocks of block 1704*a*, block 1704*b*, block 1704*c* of blockchain 1704 can include respective block hash, e.g., transactions root hash 1716*a*, transactions root hash 1716*b*, and transactions root hash 1716*c*. Each of block hashes 1716*a-c* can represent a hash of a root node of a Merkle tree for the contents of the block (e.g., the transactions of the corresponding block). For example, the Merkle tree contains leaf nodes corresponding to hashes of components of the transaction, such as a reference that identifies an output of a prior transaction that is input to the transaction, an attachment, and a command. Each non-leaf node can contain a hash of the hashes of its child nodes. The Merkle tree can also be considered to have each component as the leaf node with its parent node corresponding to the hash of the component.

In the example of FIG. 17, block 1704*b* records transactions 1724*a-d*. Each of the leaf nodes 1728*a-d* contain a hash corresponding to transactions 1724*a-d* respectively. As described above, a hash (e.g., the hash in leaf node such as node 1728*a*) can b e a hash of components of a transaction (e.g., transaction 1724*a*), for example, a reference that identifies an output of a prior transaction that is input to the transaction 1724*a*, an attachment, and a command. Each of the non-leaf nodes of node 17172*a* and node 17172*b* can contain a hash of the hashes of its child nodes (e.g, leaf nodes such as node 1728*a* and node 1728*b*). In this example, node 17172*a* can contain a hash of the hashes contained in node 1728*a*, node 1728*b* and node 17172*b* can contain a hash of the hashes contained in node 1728*c*, node 1728*d*. The root node, which includes (e.g., contains) transactions root hash 1716*b*, can contain a hash of the hashes of child nodes 17172*a-b*.

A Merkle tree representation of a transaction (e.g., transaction 1724*a*) allows an entity needing access to the transaction 1724*a* to be provided with only a portion that includes the components that the entity needs. For example, if an entity needs only the transaction summary, the entity can be provided with the nodes (and each node's sibling nodes) along the path from the root node to the node of the hash of the transaction summary. The entity can confirm that the transaction summary is that used in the transaction 1724*a* by generating a hash of the transaction summary and calculating the hashes of the nodes along the path to the root node. If the calculated hash of the root node matches the hash of node 1728*a* of the transaction 1724*a*, the transaction summary is confirmed as the one used in the transaction. Because only the portion of the Merkle tree relating to components that an entity needs is provided, the entity will not have access to other components. Thus, the confidentiality of the other components is not compromised.

In some examples, the blockchain system 1700 is a bitcoin system developed to allow digital assets such as electronic cash to be transferred directly from one party to another without going through a central authority, such as financial institution (e.g., as described in the white paper entitled "Bitcoin: A Peer-to-Peer Electronic Cash System" by Satoshi Nakamoto, hereby incorporated by reference in its entirety). A bitcoin (an electronic coin) can be represented by a chain of transactions that transfers ownership from one party to another party.

To transfer ownership of a digital asset, such as a bitcoin, using the blockchain system 1700, a new transaction, such as one of transactions 1724*a-d*, is generated and added to a stack of transactions in a block, e.g., block 1704*b*. To record a transaction in a blockchain, each party and asset involved with the transaction needs an account that is identified by a digital token. For example, when a first user wants to transfer an asset that the first user owns to a second user, the first and second user both create accounts, and the first user also creates an account that is uniquely identified by the asset's identification number. The account for the asset identifies the first user as being the current owner of the asset. The first user (i.e., the current owner) creates a transaction (e.g., transaction 1724*a*) against the account for the asset that indicates that the transaction 1724*a* is a transfer of ownership and outputs a token identifying the second user as the next owner and a token identifying the asset. The transaction 1724*a* is signed by the private key of the first user (i.e., the current owner), and the transaction 1724*a* is evidence that the second user is now the new current owner and that ownership has been transferred from the first to the second user.

The transaction 1724*a* (e.g., a new transaction), which includes the public key of the new owner (e.g., a second user to whom a digital asset is assigned ownership in the transaction), is digitally signed by the first user with the first user's private key to transfer ownership to the second user (e.g., new owner), as represented by the second user public key. The signing by the owner of the bitcoin is an authorization by the owner to transfer ownership of the bitcoin to the new owner via the transaction 1724*a* (e.g., the new transaction). Once the block is full, the block is "capped"

with a block header, that is, a hash digest of all the transaction identifiers within the block. The block header is recorded as the first transaction in the next block in the chain, creating a mathematical hierarchy called the "blockchain." To verify the current owner, the blockchain 1704 of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

Additionally, in some embodiments, the blockchain system 1700 uses one or more smart contracts to enable more complex transactions. A smart contract includes computer code implementing transactions of a contract. The computer code can be executed on a secure platform (e.g., an Ethereum platform, which provides a virtual machine) that supports recording transactions (e.g., 1724*a-d*) in blockchains. For example, a smart contract can be a self-executing contract with the terms of the agreement between buyer and seller being directly written into lines of code. The code and the agreements contained therein exist across a distributed, decentralized blockchain network.

In addition, the smart contract can itself be recorded as a transaction 1724*a* in the blockchain 1704 using a token that is a hash of node 1728*a* of the computer code so that the computer code that is executed can be authenticated. When deployed, a constructor of the smart contract executes, initializing the smart contract and its state. The state of a smart contract is stored persistently in the blockchain 1704. When a transaction 1724*a* is recorded against a smart contract, a message is sent to the smart contract, and the computer code of the smart contract executes to implement the transaction (e.g., debit a certain amount from the balance of an account). The computer code ensures that all the terms of the contract are complied with before the transaction 1724*a* is recorded in the blockchain 1704.

For example, a smart contract can support the sale of an asset. The inputs to a smart contract to sell an asset can be tokens identifying the seller, the buyer, the asset, and the sale price in U.S. dollars or cryptocurrency. The computer code is used to ensure that the seller is the current owner of the asset and that the buyer has sufficient funds in their account. The computer code records a transaction (e.g., transaction 1724*a*) that transfers the ownership of the asset to the buyer and a transaction (e.g., transaction 1724*b*) that transfers the sale price from the buyer's account to the seller's account. If the seller's account is in U.S. dollars and the buyer's account is in Canadian dollars, the computer code can retrieve a currency exchange rate, determine how many Canadian dollars the seller's account should be debited, and record the exchange rate. If either of transaction 1724*a* or transaction 1724*b* is not successful, neither transaction is recorded.

When a message is sent to a smart contract to record a transaction 1724*a*, the message is sent to each node that maintains a replica of the blockchain 1704. Each node executes the computer code of the smart contract to implement the transaction 1724*a*. For example, if a hundred nodes each maintain a replica of the blockchain 1704, the computer code executes at each of the hundred nodes. When a node completes execution of the computer code, the result of the transaction 1724*a* is recorded in the blockchain 1704. The nodes employ a consensus algorithm to decide which transactions (e.g., transaction 1724*c*) to keep and which transactions (e.g., transaction 1724*d*) to discard. Although the execution of the computer code at each node helps ensure the authenticity of the blockchain 1704, large amounts of computer resources are required to support such redundant execution of computer code.

Although blockchains can effectively store transactions 1724*a-d*, the large amount of computer resources, such as storage and computational power, needed to maintain all the replicas of the blockchain can be problematic. To overcome this problem, some systems for storing transactions 1724*a-d* do not use blockchains, but rather have each party to a transaction maintain its own copy of the transaction 1724*a*. One such system is the Corda™ system developed by R3™ that provides a decentralized distributed ledger platform in which each participant in the platform has a node (e.g., computer system) that maintains its portion of the distributed ledger.

When parties agree on the terms of a transaction 1724*a*, a party submits the transaction 1724*a* to a notary, which is a trusted node, for notarization. The notary maintains a consumed output database of transaction outputs that have been input into other transactions. When a transaction 1724*a* is received, the notary checks the inputs to the transaction 1724*a* against the consumed output database to ensure that the outputs that the inputs reference have not been spent. If the inputs have not been spent, the notary updates the consumed output database to indicate that the referenced outputs have been spent, notarizes the transaction 1724*a* (e.g., by signing the transaction or a transaction identifier with a private key of the notary), and sends the notarized transaction to the party that submitted the transaction 1724*a* for notarization. When the party receives the notarized transaction, the party stores the notarized transaction and provides the notarized transaction to the counterparties.

In embodiments, a notary is a non-validating notary or a validating notary. When a non-validating notary is to notarize a transaction (e.g., transaction 1724*b*), the non-validating notary determines that the prior output of a prior transaction (e.g., transaction 1724*a*), that is, the input of a current transaction, e.g., transaction 1724*b*, has not been consumed. If the prior output has not been consumed, the non-validating notary notarizes the transaction 1724*b* by signing a hash of node 1728*b* of the transaction. To notarize a transaction 1724*b*, a non-validating notary needs only the identification of the prior output (e.g., the hash of node 1728*a* of the prior transaction (e.g., transaction 1724*a*) and the index of the output) and the portion of the Merkle tree needed to calculate the hash of node 1728*b* of the transaction 1724*b*.

As described herein, in some embodiments, the blockchain system 1700 uses one or more smart contracts to enable more complex transactions. For example, a validating notary validates a transaction (e.g., transaction 1724*d*), which includes verifying that prior transactions 1724*a-c* in a backchain of transactions are valid. The backchain refers to the collection of prior transactions (e.g., transaction 1724*c*) of a transaction 1724*d*, as well as prior transactions of transaction 1724*a*, transaction 1724*b*, and transaction 1724*c*, and so on. To validate a transaction 1724*d*, a validating notary invokes validation code of the transaction 1724*d*. In one example, a validating notary invokes validation code of a smart contract of the transaction 1724*d*. The validation code performs whatever checks are needed to comply with the terms applicable to the transaction 1724*d*. This checking can include retrieving the public key of the owner from the prior transaction (e.g., transaction 1724*c*) (pointed to by the input state of the transaction 1724*d*) and checks the signature of the transaction 1724*d*, ensuring that the prior output of a prior transaction that is input has not been consumed, and checking the validity of each transaction (e.g., transaction 1724c) in the backchain of the transactions. If the validation code indicates that the transaction 1724d is valid, the validating notary notarizes the transaction 1724d and records the output of the prior transaction (e.g., transaction 1724c) as consumed.

In some examples, to verify that the transactions 1724a-d in a ledger stored at a node are correct, the blocks, e.g., block 1704a, block 1704b, block 1704c in the blockchain 1704 can be accessed from oldest block (e.g., block 1704a) to newest block (e.g., block 1704c), generating a new hash of the block 1704c and comparing the new hash to the hash 1708c generated when the block 1704c was created. If the hashes are the same, then the transactions in the block are verified. In one example, the Bitcoin system also implements techniques to ensure that it would be infeasible to change a transaction 1724a and regenerate the blockchain 1704 by employing a computationally expensive technique to generate a nonce 1720b that is added to the block when it is created. A bitcoin ledger is sometimes referred to as an Unspent Transaction Output ("UTXO") set because it tracks the output of all transactions that have not yet been spent.

In some embodiments, a self-sovereign identity (SSI) approach to digital identity is used that gives individuals control over the information they use to prove who they are to web sites, services, and applications across the web. In an SSI system, the user accesses services in a streamlined and secure manner, while maintaining control over the information associated with their identity. SSI addresses the difficulty of establishing trust in an interaction. In order to be trusted, one party in an interaction will present credentials to the other parties, and those relying on parties can verify that the credentials came from an issuer that they trust. In this way, the verifier's trust in the issuer is transferred to the credential holder. This basic structure of SSI with three participants is sometimes called "the trust triangle". For an identity system to be self-sovereign, users control the verifiable credentials that they hold and their consent is required to use those credentials. This reduces the unintended sharing of users' personal data.

In an SSI system, holders generate and control unique identifiers called decentralized identifiers. Most SSI systems are decentralized, where the credentials are managed using crypto wallets and verified using public-key cryptography anchored on a distributed ledger. The credentials may contain data from an issuer's database, a social media account, a history of transactions on an e-commerce site, or attestation from friends or colleagues.

FIG. 18A is a drawing illustrating a process performed in part by applying hash functions, in accordance with one or more embodiments of this disclosure. The process 1800 shown by FIG. 18A uses a hash algorithm to generate a non-fungible token (NFT) or perform a cryptographic transaction on a blockchain. An example blockchain 1704, e.g., as shown in FIG. 18A, is also illustrated and described in detail with reference to FIG. 17. The process 1800 can be performed by a computer system such as that described with reference to FIG. 14 and/or by nodes of the blockchain 1704. Some embodiments include different and/or additional steps or perform steps in different orders.

In embodiments, a digital message, electronic art, a digital collectible, any other form of digital content, or a combination thereof digital content 1804a can be hashed using hashing algorithm 1808a. The hashing algorithm 1808a (sometimes referred to as a "hash function") can be a function used to map data of arbitrary size (e.g., digital content 1804a) to fixed-size values (e.g., hash of values 1812a). The values 1812a that are returned by the hashing algorithm 1808a can be called hash values, hash codes, digests, or hashes. The values 1812a can be used to index a fixed-size table called a hash table. A hash table, also known as a hash map, is a data structure that implements an associative array or dictionary, which is an abstract data type that maps keys (e.g., digital content 1804a) to values 1812a.

The output of the hashed digital content (e.g., hash of values 1812a) can be inserted into a block (e.g., block 1704c) of the blockchain 1704 (e.g., comprising blocks such as blocks such as block 1704a, block 1704b, block 1704c, block 1704d). The block 1704c can include, among other things, information such as timestamp 1712c. In order to verify that the block 1704c is correct, a new hash 1812b is generated by applying hashing algorithm 1808b to the digital content 1804b. The new hash 1812b is compared to the hash of values 1812a in the blockchain 1704 at comparison step 1816. If the new hash 1812b is the same as the hash of values 1812a of the block 1704c, the comparison yields an indication that they match. For example, the decision 1820 can indicate that the hashes of values 1812a-b are the same or not. The hashes can be indicated to be the same if the characters of the hash match. The hashing algorithms 1808a-b can include any suitable hashing algorithm. Examples include Message Digest 5 (MD5), Secure Hashing Algorithm (SHA) and/or the likes.

Components of the process 1800 can generate or validate an NFT, which is a cryptographic asset that has a unique identification code and metadata that uniquely identifies the NFT. In one example, the digital content 1804a can be hashed and minted to generate an NFT, or the digital content 1804a can represent an NFT that is verified using the process 1800 and the digital content 1804b. An NFT can include digital data stored in the blockchain 1704. The ownership of an NFT is recorded in the blockchain 1704 and transferrable by an owner, allowing the NFT to be sold and traded. The NFT contains a reference to digital files such as photos, videos, or audio (e.g., digital content 1804a). Because NFTs are uniquely identifiable assets, they differ from cryptocurrencies, which are fungible. In particular, NFTs function like cryptographic tokens, but unlike cryptocurrencies such as Bitcoin or Ethereum™, NFTs are not mutually interchangeable, and so are not fungible.

The NFT can be associated with a particular digital or physical asset such as images, art, music, and sport highlights and can confer licensing rights to use the asset for a specified purpose. As with other assets, NFTs are recorded on a blockchain when a blockchain 1704 concatenates records containing cryptographic hashes-sets of characters that identify a set of data-onto previous records, creating a chain of identifiable data blocks 1704a-d. A cryptographic transaction process enables authentication of each digital file by providing a digital signature that tracks NFT ownership. In embodiments, a data link that is part of the NFT records points to details about where the associated art is stored.

Minting an NFT can refer to the process of turning a digital file (e.g., digital content 1804a) into a crypto collectible or digital asset on blockchain 1704 (e.g., the Ethereum™ blockchain). The digital item or file (e.g., digital content 1804a) can be stored in the blockchain 1704 and cannot be able to be edited, modified, or deleted. The process of uploading a specific item onto the blockchain 1704 is known as "minting." For example, "NFT minting" can refer to a process by which a digital art or digital content 1804a becomes a part of the Ethereum™ blockchain. Thus, the process turns digital content 1804a into a crypto asset, which is easily traded or bought with cryptocurrencies on a digital marketplace without an intermediary.

Figure 18B:
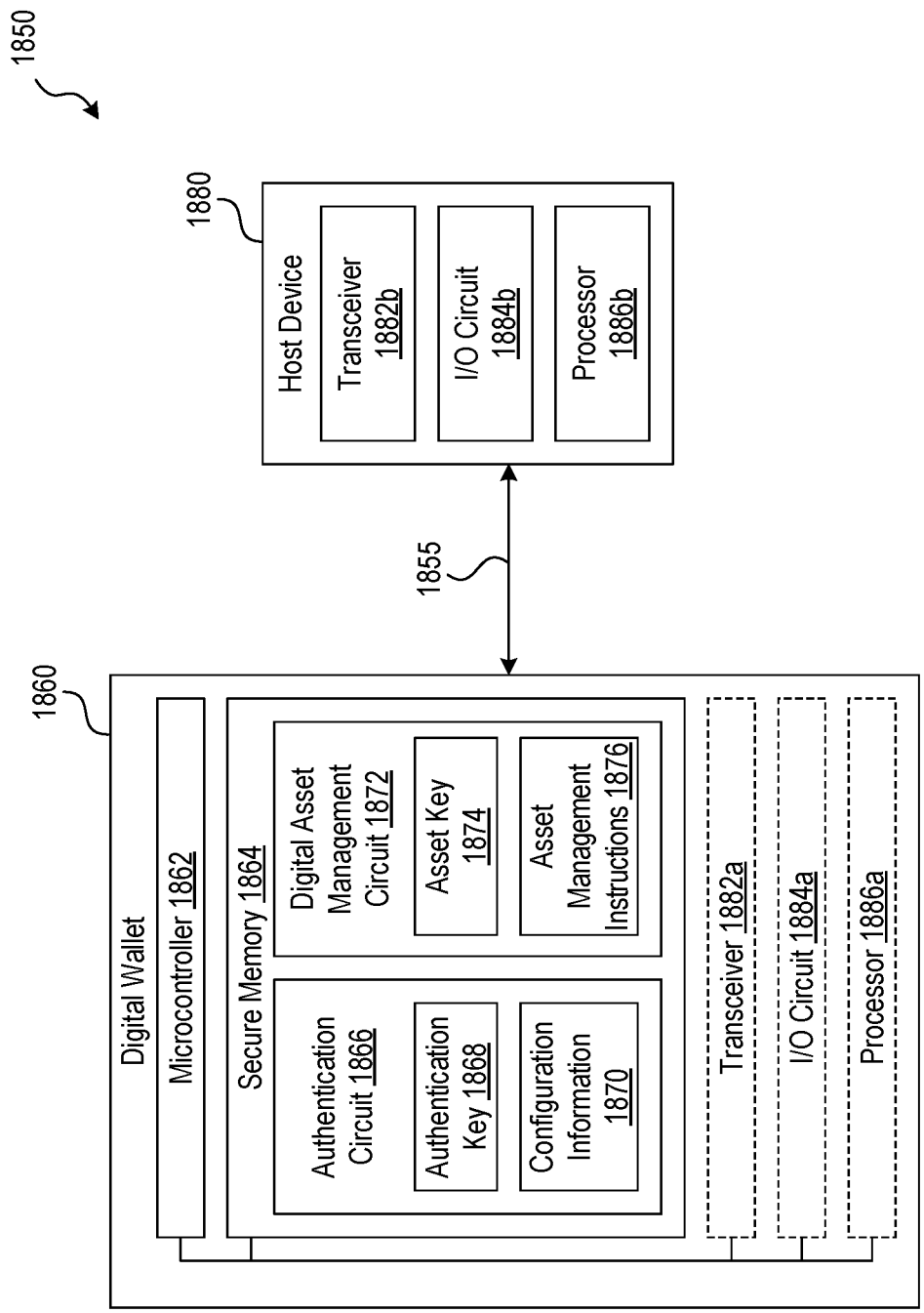
FIG. 18B is a block diagram illustrating an example digital wallet, in accordance with one or more embodiments of this disclosure.

FIG. 18B is a block diagram of a system 1850 including an example digital wallet 1860, in accordance with one or more embodiments of this disclosure. In particular, a digital wallet 1860 is an electronic entity that allows users to securely manage digital assets. According to various embodiments, the digital wallet 1860 can be a hardware-based wallet (e.g., can include dedicated hardware component(s)), a software-based wallet, or a combination thereof. Example digital assets that can be stored and managed using the digital wallet 1860 include digital coins, digital tokens, and/or the like. In some embodiments, tokens are stored on a blockchain system, such as the blockchain system 1700 described in FIG. 1. In some embodiments, the digital wallet 1860 may be capable of connecting to and managing digital assets that are native to or associated with different blockchain systems.

As defined herein, the terms "coin" and "token" refer to a digital representation of a particular asset, utility, ownership interest, and/or access right. Any suitable type of coin or token can be managed using various embodiments of the digital wallet 1860. In some embodiments, tokens include cryptocurrency, such as exchange tokens and/or stablecoins. Exchange tokens and/or stablecoins can be native to a particular blockchain system and, in some instances, can be backed by a value-stable asset, such as fiat currency, precious metal, oil, or another commodity. In some embodiments, tokens are utility tokens that provide access to a product or service rendered by an operator of the blockchain system 1700 (e.g., a token issuer). In some embodiments, tokens are security tokens, which can be securitized cryptocurrencies that derive from a particular asset, such as bonds, stocks, real estate, and/or fiat currency, or a combination thereof, and can represent an ownership right in an asset or in a combination of assets.

In some embodiments, tokens are NFTs or other non-fungible digital certificates of ownership, or decentralized finance (DeFi) tokens. DeFi tokens can be used to access feature sets of DeFi software applications (dApps) built on the blockchain system 1700. Example dApps can include decentralized lending applications (e.g., Aave), decentralized cryptocurrency exchanges (e.g., Uniswap), decentralized NFT marketplaces (e.g., OpenSea, Rarible), decentralized gaming platforms (e.g., Upland), decentralized social media platforms (e.g., Steemit), decentralized music streaming platforms (e.g., Audius), and/or the like. In some embodiments, tokens provide access rights to various computing systems and can include authorization keys, authentication keys, passwords, PINs, biometric information, access keys, and other similar information. The computing systems to which the tokens provide access can be both on-chain (e.g., implemented as dApps on a particular blockchain system 1700) or off-chain (e.g., implemented as computer software on computing devices that are separate from the blockchain system 1700).

The digital wallet 1860 can be embodied in a device that is communicatively coupled to the host device 1880 (e.g., a mobile phone, a laptop, a tablet, a desktop computer, a wearable device, a point-of-sale (POS) terminal, an automated teller machine (ATM) and the like) via the communication link 1855. In some embodiments, the host device 1880 can extend the feature set available to the user of the digital wallet 1860 when it is coupled to the host device 1880. For instance, the host device 1880 may provide the user with the ability to perform balance inquiries, convert tokens, access exchanges and/or marketplaces, perform transactions, access computing systems, and/or the like.

In some embodiments, the digital wallet 1860 and the host device 1880 can be owned and/or operated by the same entity, user, or a group of users. For example, an individual owner of the digital wallet 1860 can also operate a personal computing device that acts as a host device 1880 and provides enhanced user experience relative to the digital wallet 1860 (e.g., by providing a user interface that includes graphical features, immersive reality experience, virtual reality experience, or similar). In some embodiments, the digital wallet 1860 and the host device 1880 can be owned and/or operated by different entities, users and/or groups of users. For example, the host device 1880 can be a point-of-sale (POS) terminal at a merchant location, and the individual owner of the digital wallet 1860 can use the digital wallet 1860 as a method of payment for goods or services at the merchant location by communicatively coupling the two devices for a short period of time (e.g., via chip, via near-field communications (NFC), by scanning of a bar code, by causing the digital wallet 1860 to generate and display a quick response (QR) code) to transmit payment information from the digital wallet 1860 to the host device 1880.

The digital wallet 1860 and the host device 1880 can be physically separate and/or capable of being removably coupled. The ability to physically and communicatively uncouple the digital wallet 1860 from the host device 1880 and other devices enables the air-gapped digital wallet 1860 to act as "cold" storage, where the stored digital assets are moved offline and become inaccessible to the host device 1880 and other devices. Further, the ability to physically and communicatively uncouple the digital wallet 1860 from the host device 1880 allows the digital wallet 1860 to be implemented as a larger block of physical memory, which extends the storage capacity of the digital wallet 1860, similar to a safety deposit box or vault at a brick-and-mortar facility.

Accordingly, in some embodiments, the digital wallet 1860 and the host device 1880 are physically separate entities. In such embodiments, the communications link 1855 can include a computer network. For instance, the digital wallet 1860 and the host device 1880 can be paired wirelessly via a short-range communications protocol (e.g., Bluetooth, ZigBee, infrared communication) or via another suitable network infrastructure. In some embodiments, the digital wallet 1860 and the host device 1880 are removably coupled. For instance, the host device 1880 can include a physical port, outlet, opening, or similar to receive and communicatively couple to the digital wallet 1860, directly or via a connector.

In some embodiments, the digital wallet 1860 can include or be stored on a tangible storage media, such as a dynamic random-access memory (DRAM) stick, a memory card, a secure digital (SD) card, a flash drive, a solid state drive (SSD), a magnetic hard disk drive (HDD), or an optical disc, and/or the like and can connect to the host device via a suitable interface, such as a memory card reader, a USB port, a micro-USB port, an eSATA port, and/or the like.

In some embodiments, the digital wallet 1860 can include or be stored on an integrated circuit, such as a SIM card, a smart cart, and/or the like. For instance, in some embodiments, the digital wallet 1860 can be a physical smart card that includes an integrated circuit, such as a chip that can store data. In some embodiments, the digital wallet 1860 is a contactless physical smart card. Advantageously, such embodiments enable data from the card to be read by a host device as a series of application protocol data units (APDUs) according to a conventional data transfer protocol between payment cards and readers (e.g., ISO/IEC 7816), which enhances interoperability between the cryptographic payment ecosystem and payment card terminals.

In some embodiments, the digital wallet 1860 and the host device 1880 are non-removably coupled. For instance, various components of the digital wallet 1860 can be co-located with components of the host device 1880 in the housing of the host device 1880. In such embodiments, the host device 1880 can be a mobile device, such as a phone, a wearable, or similar, and the digital wallet 1860 can be built into the host device. The integration between the digital wallet 1860 and the host device 1880 can enable improved user experience and extend the feature set of the digital wallet 1860 while preserving computing resources (e.g., by sharing the computing resources, such as transceiver, processor, and/or display or the host device 1880). The integration further enables the ease of asset transfer between parties. The integration can further enhance loss protection options, as recovering a password or similar authentication information, rather than recovering a physical device, can be sufficient to restore access to digital assets stored in the digital wallet 1860. In some embodiments, the non-removably coupled digital wallet 1860 can be air-gapped by, for example, disconnecting the host device 1880 from the Internet.

As shown, the digital wallet 1860 can include a microcontroller 1862. The microcontroller 1862 can include or be communicatively coupled to (e.g., via a bus or similar communication pathway) at least a secure memory 1864. The digital wallet 1860 can further include a transceiver 1881*a*, and input/output circuit 1884*a*, and/or a processor 1886*a*. In some embodiments, however, some or all of these components can be omitted.

In some embodiments, the digital wallet 1860 can include a transceiver 1882*a* and therefore can be capable of independently connecting to a network and exchanging electronic messages with other computing devices. In some embodiments, the digital wallet 1860 does not include a transceiver 1882*a*. The digital wallet 1860 can be capable of connecting to or being accessible from a network, via the transceiver 1882*b* of the host device 1880, when the digital wallet 1860 is docked to the host device 1880. For example, in some embodiments, the user of the digital wallet 1860 can participate in token exchange activities on decentralized exchanges when the digital wallet 1860 is connected to the host device 1880.

In some embodiments, the digital wallet 1860 can include an input/output circuit 1884*a*, which may include user-interactive controls, such as buttons, sliders, gesture-responsive controls, and/or the like. The user-interactive controls can allow a user of the digital wallet 1860 to interact with the digital wallet 1860 (e.g., perform balance inquiries, convert tokens, access exchanges and/or marketplaces, perform transactions, access computing systems, and/or the like). In some embodiments, the user can access an expanded feature set, via the input/output circuit 1884*b* of the host device 1880, when the digital wallet 1860 is docked to the host device 1880. For example, host device 1880 can include computer-executable code structured to securely access data from the digital wallet 1860 of the digital wallet 1860 and to perform operations using the data. The data can include authentication information, configuration information, asset keys, and/or token management instructions. The data can be used by an application that executes on or by the host device 1880. The data can be used to construct application programming interface (API) calls to other applications that require or use the data provided by digital wallet 1860. Other applications can include any on-chain or off-chain computer applications, such as dApps (e.g., decentralized lending applications, decentralized cryptocurrency exchanges, decentralized NFT marketplaces, decentralized gaming platforms, decentralized social media platforms, decentralized music streaming platforms), third-party computing systems (e.g., financial institution computing systems, social networking sites, gaming systems, online marketplaces), and/or the like.

The secure memory 1864 is shown to include an authentication circuit 1866 and a digital asset management circuit 1872. The authentication circuit 1866 and/or digital asset management circuit 1872 include computer-executable code that, when executed by one or more processors, such as one or more processors 1886*a* and/or 1886*b*, performs specialized computer-executable operations. For example, the authentication circuit 1866 can be structured to cause the digital wallet 1860 to establish, maintain and manage a secure electronic connection with another computing device, such as the host device 1880. The digital asset management circuit 1872 can be structured to cause the digital wallet 1860 to allow a user to manage the digital assets accessible via the digital wallet 1860. In some embodiments, the authentication circuit 1866 and the digital asset management circuit 1872 are combined in whole or in part.

As shown, the authentication circuit 1866 can include retrievably stored security, authentication, and/or authorization data, such as the authentication key 1868. The authentication key 1868 can be a numerical, alphabetic, or alphanumeric value or combination of values. The authentication key 1868 can serve as a security token that enables access to one or more computing systems, such as the host device 1880. For instance, in some embodiments, when the digital wallet 1860 is paired or docked to (e.g., establishes an electronic connection with) the host device 1880, the user may be prompted to enter authentication information via the input output circuit(s) 1884*a* and/or 1884*b*. The authentication information may include a PIN, a password, a pass phrase, biometric information (e.g., fingerprint, a set of facial features, a retinal scan), a voice command, and/or the like. The authentication circuit 1866 can compare the user-entered information to the authentication key 1868 and maintain the electronic connection if the items match at least in part.

As shown, the authentication circuit 1866 can include retrievably stored configuration information 1870. The configuration information 1870 can include a numerical, alphabetic, or alphanumeric value or combination of values. These items can be used to enable enhanced authentication protocols. For instance, the configuration information 1870 can include a timeout value for an authorized connection between the digital wallet 1860 and the host device 1880. The configuration information 1870 can also include computer-executable code. In some embodiments, for example, where a particular digital wallet 1860 is setup to pair with only one or a small number of pre-authorized host devices 1880, the configuration information 1870 can include a device identifier and/or other device authentication information, and the computer-executable code may be structured to verify the device identifier and/or other device authentication information against the information associated with or provided by the host device 1880. When a pairing is attempted, the computer-executable code may initiate or cause the host device 1880 to initiate an electronic communication (e.g., an email message, a text message) using user contact information stored as configuration information 1870.

As shown, the digital asset management circuit 1872 can include retrievably stored digital asset data, such as the asset key 1874. The asset key 1874 can be a numerical, alphabetic, or alphanumeric value or combination of values. In some embodiments, the asset key 1874 is a private key in a public/private key pair, a portion thereof, or an item from which the private key can be derived. Accordingly, the asset key 1874 proves ownership of a particular digital asset stored on a blockchain system 1700. The asset key 1874 can allow a user to perform blockchain transactions involving the digital asset. The blockchain transactions can include computer-based operations to earn, lend, borrow, long/short, earn interest, save, buy insurance, invest in securities, invest in stocks, invest in funds, send and receive monetary value, trade value on decentralized exchanges, invest and buy assets, sell assets, and/or the like. The digital wallet 1860 can be identified as a party to a blockchain transaction on the blockchain system 1700 using a unique cryptographically generated address (e.g., the public key in the public/private key pair).

As shown, the digital asset management circuit 1872 can also include retrievably stored asset management instructions 1876. The asset management instructions 1876 can include a numerical, alphabetic, or alphanumeric value or combination of values. These items can be used to enable computer-based operations related to managing digital assets identified by the asset keys 1874. For instance, the asset management instructions 1876 can include parameter values, metadata, and/or similar values associated with various tokens identified by the asset keys 1874 and/or by the blockchain systems 1700 associated with particular tokens. The asset management instructions 1876 can also include computer-executable code. In some embodiments, for example, asset management functionality (e.g., balance inquiry and the like) can be executable directly from the digital wallet 1860 rather than or in addition to being executable from the host device 1880.

Figure 19:
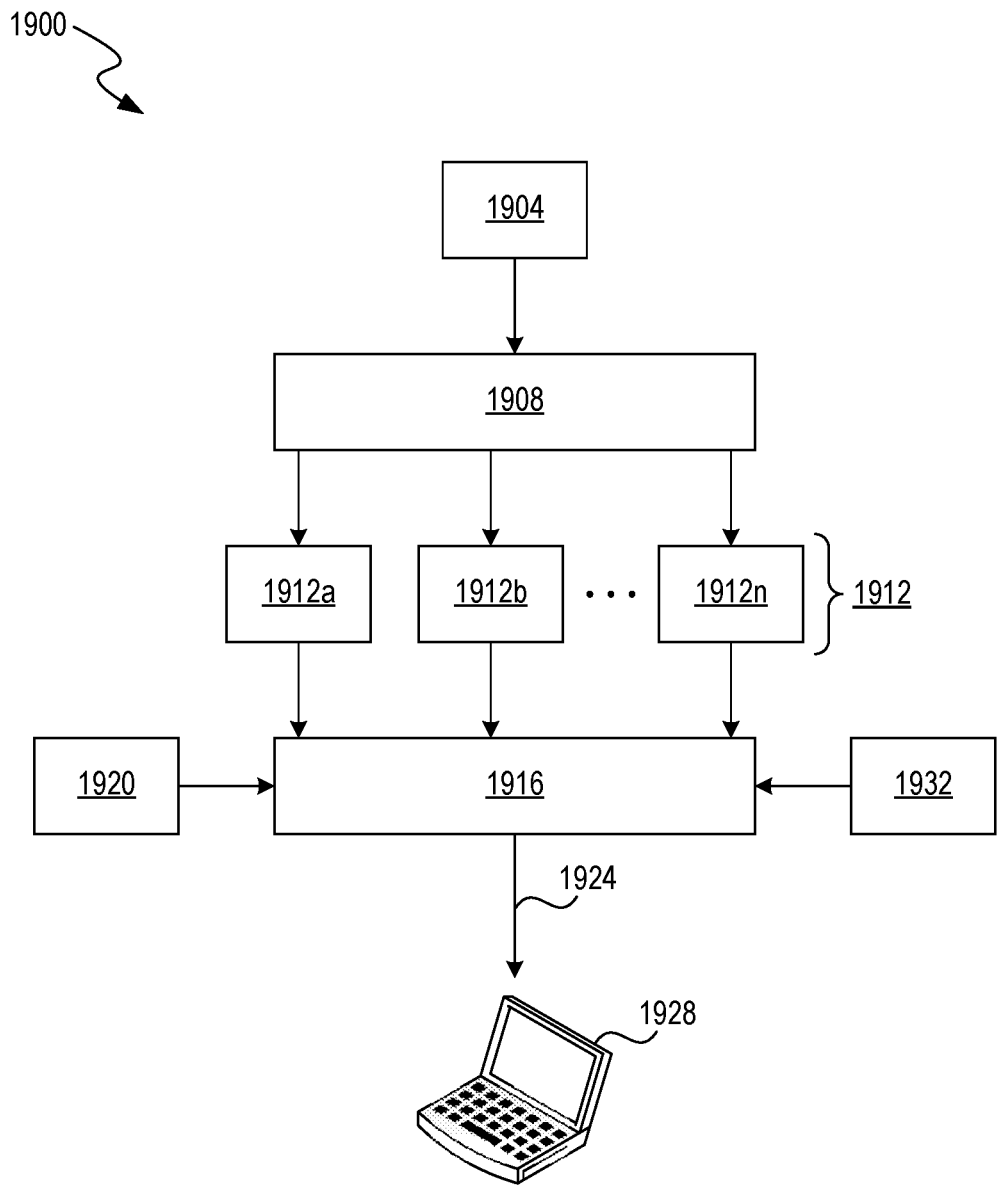
FIG. 19 is a block diagram illustrating an example machine learning (ML) system, in accordance with one or more embodiments.

FIG. 19 is a block diagram illustrating an example machine learning (ML) system 1900, in accordance with one or more embodiments. The ML system 1900 is implemented using components of the example computer system 1400 illustrated and described in more detail with reference to FIG. 14. Likewise, embodiments of the ML system 1900 can include different and/or additional components or be connected in different ways. The ML system 1900 is sometimes referred to as a ML module.

The ML system 1900 includes a feature extraction module 1908 implemented using components of the example computer system 1400 illustrated and described in more detail with reference to FIG. 14. In some embodiments, the feature extraction module 1908 extracts a feature vector 1912 from input data 1904. For example, the input data 1904 can include one or more videos of an environment. The feature vector 1912 includes features 1912a, 1912b, . . . , 1912n. The feature extraction module 1908 reduces the redundancy in the input data 1904, e.g., repetitive data values, to transform the input data 1904 into the reduced set of features 1912, e.g., features 1912a, 1912b, . . . , 1912n. The feature vector 1912 contains the relevant information from the input data 1904, such that events or data value thresholds of interest can be identified by the ML model 1916 by using this reduced representation. In some example embodiments, the following dimensionality reduction techniques are used by the feature extraction module 1908: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 1916 performs deep learning (also known as deep structured learning or hierarchical learning) directly on the input data 1904 to learn data representations, as opposed to using task-specific algorithms. In deep learning, no explicit feature extraction is performed; the features 1912 are implicitly extracted by the ML system 1900. For example, the ML model 1916 can use a cascade of multiple layers of nonlinear processing units for implicit feature extraction and transformation. Each successive layer uses the output from the previous layer as input. The ML model 1916 can thus learn in supervised (e.g., classification) and/or unsupervised (e.g., pattern analysis) modes. The ML model 1916 can learn multiple levels of representations that correspond to different levels of abstraction, wherein the different levels form a hierarchy of concepts. In this manner, the ML model 1916 can be configured to differentiate features of interest from background features.

In alternative example embodiments, the ML model 1916, e.g., in the form of a CNN generates the output 1924, without the need for feature extraction, directly from the input data 1904. The output 1924 is provided to the computer device 1928. The computer device 1928 is a server, computer, tablet, smartphone, smart speaker, etc., implemented using components of the example computer system 1400 illustrated and described in more detail with reference to FIG. 14. In some embodiments, the steps performed by the ML system 1900 are stored in memory on the computer device 1928 for execution. In other embodiments, the output 1924 is displayed on the display 1418 illustrated and described in more detail with reference to FIG. 14.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 1916 can be a CNN that includes both convolutional layers and max pooling layers. The architecture of the ML model 1916 can be "fully convolutional," which means that variable sized sensor data vectors can be fed into it. For all convolutional layers, the ML model 1916 can specify a kernel size, a stride of the convolution, and an amount of zero padding applied to the input of that layer. For the pooling layers, the model 1916 can specify the kernel size and stride of the pooling.

In some embodiments, the ML system 1900 trains the ML model 1916, based on the training data 1920, to correlate the feature vector 1912 to expected outputs in the training data 1920. As part of the training of the ML model 1916, the ML system 1900 forms a training set of features and training labels by identifying a positive training set of features that have been determined to have a desired property in question, and, in some embodiments, forms a negative training set of features that lack the property in question.

The ML system 1900 applies ML techniques to train the ML model 1916, that when applied to the feature vector 1912, outputs indications of whether the feature vector 1912 has an associated desired property or properties, such as a probability that the feature vector 1912 has a particular Boolean property, or an estimated value of a scalar property. The ML system 1900 can further apply dimensionality reduction (e.g., via linear discriminant analysis (LDA), PCA, or the like) to reduce the amount of data in the feature vector 1912 to a smaller, more representative set of data.

The ML system 1900 can use supervised ML to train the ML model 1916, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 1932 is formed of additional features, other than those in the training data 1920, which have already been determined to have or to lack the property in question. The ML system 1900 applies the trained ML model 1916 to the features of the validation set 1932 to quantify the accuracy of the ML model 1916. Common metrics applied in accuracy measurement include: Precision and Recall, where Precision refers to a number of results the ML model 1916 correctly predicted out of the total it predicted, and Recall is a number of results the ML model 1916 correctly predicted out of the total number of features that had the desired property in question. In some embodiments, the ML system 1900 iteratively re-trains the ML model 1916 until the occurrence of a stopping condition, such as the accuracy measurement indication that the ML model 1916 is sufficiently accurate, or a number of training rounds having taken place. The validation set 1932 can include data corresponding to confirmed features, environmental states, traffic, or combinations thereof. This allows the detected values to be validated using the validation set 1932. The validation set 1932 can be generated based on analysis to be performed.

In some embodiments, ML system 1900 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised machine learning to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Figure 20:
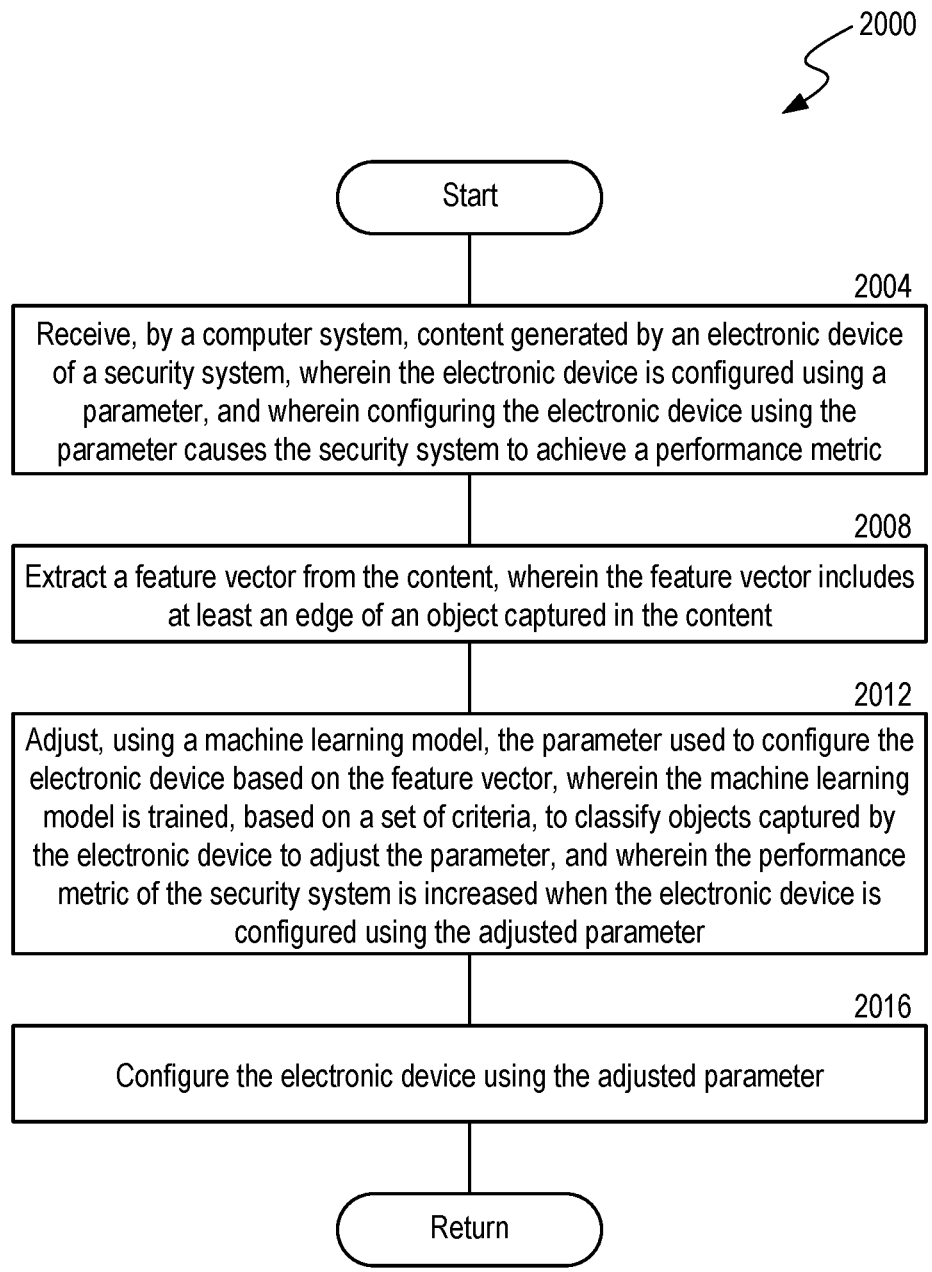
FIG. 20 is a flow diagram illustrating a process, in accordance with one or more embodiments.

FIG. 20 is a flow diagram illustrating an example process 2000, in accordance with one or more embodiments. In some implementations, process 2000 is performed by base station 105 or electronic device 110 described in more detail with reference to FIG. 1. In some implementations, the process is performed by a computer system, e.g., the example computer system 1400 illustrated and described in more detail with reference to FIG. 14. Particular entities, for example, an XR device, a blockchain node, or an ML system perform some or all of the steps of process 2000 in other implementations. Likewise, implementations can include different and/or additional steps or can perform the steps in different orders.

In step 2004, a computer system receives content generated by an electronic device of a security system. Content (e.g., audio and/or video) captured by electronic devices 110 is described in more detail with reference to FIG. 1. An example network-connected security system is described in more detail with reference to FIG. 1. In some embodiments, the network-connected security system includes a base station and one or more electronic devices. The base station and one or more electronic devices are communicatively coupled over a local network. An example network 1414 is illustrated and described in more detail with reference to FIG. 14. For example, the base station via the local network, receives content generated by the one or more electronic devices. The base station is operable as a gateway to securely connect the one or more electronic devices to an external network.

In some embodiments, the security system is a surveillance system including at least one extended-reality (XR) device. XR data is overlaid on the content for display on the at least one XR device. The XR data can include text, computer-generated graphics, or computer-generated audio. Example XR devices are illustrated and described in more detail with reference to FIGS. 15-16. The electronic device is configured using a parameter. Example electronic device parameters are described in more detail with reference to FIG. 5A. Configuring the electronic device using the parameter causes the security system to achieve a performance metric. Example performance metrics are described in more detail with reference to FIG. 13.

In step 2008, the computer system extracts a feature vector from the content. Example feature vectors are illustrated and described in more detail with reference to FIG. 19. The feature vector includes at least an edge of an object captured in the content. Edge detection is a technique of image processing used to identify points in a digital image with discontinuities, such as sharp changes in the image brightness. These points where the image brightness varies sharply are called the edges (or boundaries) of the image. Edge detection includes a variety of mathematical methods that aim at identifying edges, curves in a digital image at which the image brightness changes sharply or, more formally, has discontinuities.

In step 2012, the computer system, adjusts, using a machine learning model, the parameter used to configure the electronic device based on the feature vector. Example machine learning models are described in more detail with reference to FIG. 19. The machine learning model is trained, based on a set of criteria, to classify objects captured by the electronic device to adjust the parameter. Methods for training machine learning models are described in more detail with reference to FIG. 19. In some embodiments, training the machine learning model is performed using an XR simulation. XR simulation is described in more detail with reference to FIGS. 15-16. Example criteria are described in more detail with reference to FIG. 6. Object classification is described in more detail with reference to FIGS. 6 and 8. The performance metric of the security system is increased when the electronic device is configured using the adjusted parameter. In some embodiments, the computer system resides on the electronic device. Adjusting the parameter is performed using edge computing. Edge computing is described in more detail with reference to FIG. 15.

In step 2016, the computer system configures the electronic device using the adjusted parameter. For example, the base station causes the electronic device to be configured according to the adjusted parameter. The computer system can receive a request for access to the security system. For example, the request includes a credential stored in a digital wallet. The credential can be a password, a cryptographic key, a pass-phrase, a hash value, or any of the security information described in more detail with reference to FIGS. 18A-B. The request for access to the security system can be received using self-sovereign identity (SSI). SSI is described in more detail with reference to FIG. 17. For example, SSI can be implemented using the blockchain system 1700, which stores the credential. In some embodiments, the parameter is associated with a type of environment in which the security system is located. Example types of environments are described in more detail with reference to FIGS. 15-16.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
    receiving, by a computer system, content generated by an electronic device of a security system, wherein the electronic device is configured using a parameter, and wherein configuring the electronic device using the parameter causes the security system to achieve a performance metric;
    extracting a feature vector from the content, wherein the feature vector includes at least an edge of an object captured in the content;
    adjusting, using a machine learning model, the parameter used to configure the electronic device based on the feature vector, wherein the machine learning model is trained, based on a set of criteria, to classify objects captured by the electronic device to adjust the parameter, and wherein the performance metric of the security system is increased when the electronic device is configured using the adjusted parameter; and
    configuring the electronic device using the adjusted parameter.

2. The method of claim 1, wherein the security system is a surveillance system including at least one extended-reality (XR) device, and wherein XR data is overlaid on the content for display on the at least one XR device.

3. The method of claim 1, comprising receiving a request for access to the security system, wherein the request includes a credential stored in a digital wallet.

4. The method of claim 1, comprising receiving a request for access to the security system using self-sovereign identity (SSI).

5. The method of claim 1, wherein the computer system resides on the electronic device.

6. The method of claim 1, comprising training the machine learning model, based on the set of criteria, using an XR simulation.

7. The method of claim 1, wherein the parameter is associated with a type of environment in which the security system is located.

8. A method for configuring a network-connected security system comprising a base station and one or more electronic devices, the base station and one or more electronic devices communicatively coupled over a local network, the base station operable as a gateway to securely connect the one or more electronic devices to an external network, the method comprising:
    receiving, by the base station via the local network, content generated by the one or more electronic devices, wherein an electronic device of the one or more electronic devices is configured using a parameter, and wherein configuring the electronic device using the parameter causes the network-connected security system to achieve a performance metric;
    extracting a feature vector from the content, wherein the feature vector includes at least an edge of an object captured in the content;
    adjusting, using a machine learning model, the parameter used to configure the electronic device based on the feature vector, wherein the machine learning model is trained, based on a set of criteria, to classify objects captured by the one or more electronic devices to adjust the parameter, and wherein the performance metric of the network-connected security system is increased when the electronic device is configured using the adjusted parameter; and
    causing, by the base station, the electronic device to be configured according to the adjusted parameter.

9. The method of claim 8, wherein the network-connected security system is a surveillance system including at least one extended-reality (XR) device, and wherein XR data is overlaid on the content for display on the at least one XR device.

10. The method of claim 8, comprising receiving a request for access to the network-connected security system, wherein the request includes a credential stored in a digital wallet.

11. The method of claim 8, comprising receiving a request for access to the network-connected security system using self-sovereign identity (SSI).

12. The method of claim 8, wherein adjusting the parameter is performed using edge computing.

13. The method of claim 8, comprising training the machine learning model, based on the set of criteria, using an XR simulation.

14. The method of claim 8, wherein the parameter is associated with a type of environment in which the network-connected security system is located.

15. A base station of a network-connected security system, the base station comprising:
one or more processors; and
a non-transitory computer-readable storage medium storing instructions, which when executed by the one or more processors cause the one or more processors to:
receive, via a local network, content generated by one or more electronic devices, wherein an electronic device of the one or more electronic devices is configured using a parameter, and wherein configuring the electronic device using the parameter causes the network-connected security system to achieve a performance metric;
extract a feature vector from the content, wherein the feature vector includes at least an edge of an object captured in the content;
adjust, using a machine learning model, the parameter used to configure the electronic device based on the feature vector, wherein the machine learning model is trained, based on a set of criteria, to classify objects captured by the one or more electronic devices to adjust the parameter, and wherein the performance metric of the network-connected security system is increased when the electronic device is configured using the adjusted parameter; and
cause the electronic device to be configured according to the adjusted parameter.

16. The base station of claim 15, wherein the network-connected security system is a surveillance system including at least one extended-reality (XR) device, and wherein XR data is overlaid on the content for display on the at least one XR device.

17. The base station of claim 15, wherein the instructions cause the one or more processors to receive a request for access to the network-connected security system, wherein the request includes a credential stored in a digital wallet.

18. The base station of claim 15, wherein the instructions cause the one or more processors to receive a request for access to the network-connected security system using self-sovereign identity (SSI).

19. The base station of claim 15, wherein adjusting the parameter is performed using edge computing.

20. The base station of claim 15, wherein the instructions cause the one or more processors to train the machine learning model, based on the set of criteria, using an XR simulation.

* * * * *